United States Patent
Haapanen et al.

(10) Patent No.: US 9,819,674 B2
(45) Date of Patent: Nov. 14, 2017

(54) SYSTEM, APPARATUS AND METHOD FOR SECURE OPERATION OF IMAGE FORMING DEVICE

(71) Applicants: Tom Haapanen, Heidelberg (CA); Matt Cecile, Waterloo (CA)

(72) Inventors: Tom Haapanen, Heidelberg (CA); Matt Cecile, Waterloo (CA)

(73) Assignee: RICOH COMPANY, LTD., Tokyo (JP)

(*) Notice: Subject to any disclaimer, the term of this patent is extended or adjusted under 35 U.S.C. 154(b) by 84 days.

(21) Appl. No.: 14/926,978

(22) Filed: Oct. 29, 2015

(65) Prior Publication Data

US 2017/0126671 A1    May 4, 2017

(51) Int. Cl.
| | |
|---|---|
| *H04L 29/06* | (2006.01) |
| *H04B 17/318* | (2015.01) |
| *H04W 4/00* | (2009.01) |
| *H04W 4/02* | (2009.01) |
| *H04W 12/06* | (2009.01) |
| *H04W 12/08* | (2009.01) |
| *H04W 60/00* | (2009.01) |

(52) U.S. Cl.
CPC ....... *H04L 63/0853* (2013.01); *H04B 17/318* (2015.01); *H04L 63/108* (2013.01); *H04W 4/008* (2013.01); *H04W 4/023* (2013.01); *H04W 12/06* (2013.01); *H04W 12/08* (2013.01); *H04W 60/00* (2013.01)

(58) Field of Classification Search
CPC . H04L 63/0853; H04L 63/108; H04B 17/318; H04W 4/008; H04W 4/023; H04W 12/06; H04W 12/08; H04W 60/00
USPC .......................................................... 726/144
See application file for complete search history.

(56) References Cited

U.S. PATENT DOCUMENTS

| | | | | |
|---|---|---|---|---|
| 5,862,321 | A * | 1/1999 | Lamming | G06F 15/0225 358/403 |
| 6,397,261 | B1 * | 5/2002 | Eldridge | G06F 17/30011 707/E17.008 |
| 6,421,716 | B1 * | 7/2002 | Eldridge | G06F 17/30011 455/433 |
| 6,430,601 | B1 * | 8/2002 | Eldridge | G06Q 10/10 707/E17.005 |
| 6,487,189 | B1 * | 11/2002 | Eldridge | G06Q 10/107 370/338 |
| 6,493,760 | B1 * | 12/2002 | Pendlebury | H04L 29/06 709/217 |
| 6,515,988 | B1 * | 2/2003 | Eldridge | G06F 15/0225 370/389 |
| 8,891,106 | B1 | 11/2014 | Haapanen | |
| 9,122,433 | B2 | 9/2015 | Haapanen | |
| 9,130,838 | B2 | 9/2015 | Anderson et al. | |
| 2008/0270516 | A1 | 10/2008 | Ragnet et al. | |
| 2012/0233679 | A1 | 9/2012 | Shedrinsky | |
| 2012/0265865 | A1 | 10/2012 | Tanaka et al. | |
| 2012/0266073 | A1 | 10/2012 | Tanaka et al. | |
| 2013/0298208 | A1 | 11/2013 | Ayed | |

(Continued)

*Primary Examiner* — Kambiz Zand
*Assistant Examiner* — Benjamin Kaplan
(74) *Attorney, Agent, or Firm* — Cooper & Dunham LLP

(57) ABSTRACT

Systems, apparatuses and methodologies, for secure operation of an image forming (or output) device, by automated handshaking between the image forming (or output) device and a user's mobile device, when the mobile device is within short-range operation range.

21 Claims, 28 Drawing Sheets

(56) References Cited

U.S. PATENT DOCUMENTS

2014/0222980 A1 8/2014 Hagiwara et al.
2014/0223325 A1 8/2014 Melendez et al.

* cited by examiner

| List of Currently Registered Devices In System 200 |||
|---|---|---|
| Subnet | Device | MAC Address |
| Subnet A | Mobile Apparatus 101 | 6E:14:D5:3E:96:88 |
| | Output Device 201 | 9F:14:27:0E:96:F9 |
| | Output Device 202 | 01:23:45:A7:89:A3 |
| | Output Device 203 | 08:00:27:0E:22:B8 |
| Subnet B | Output Device 204 | 12:04:7A:0E:78:B3 |
| | Output Device 205 | E1:D4:27:0E:8E:B8 |
| | Output Device 206 | 65:12:2D:3E:34:B8 |

Fig. 2B

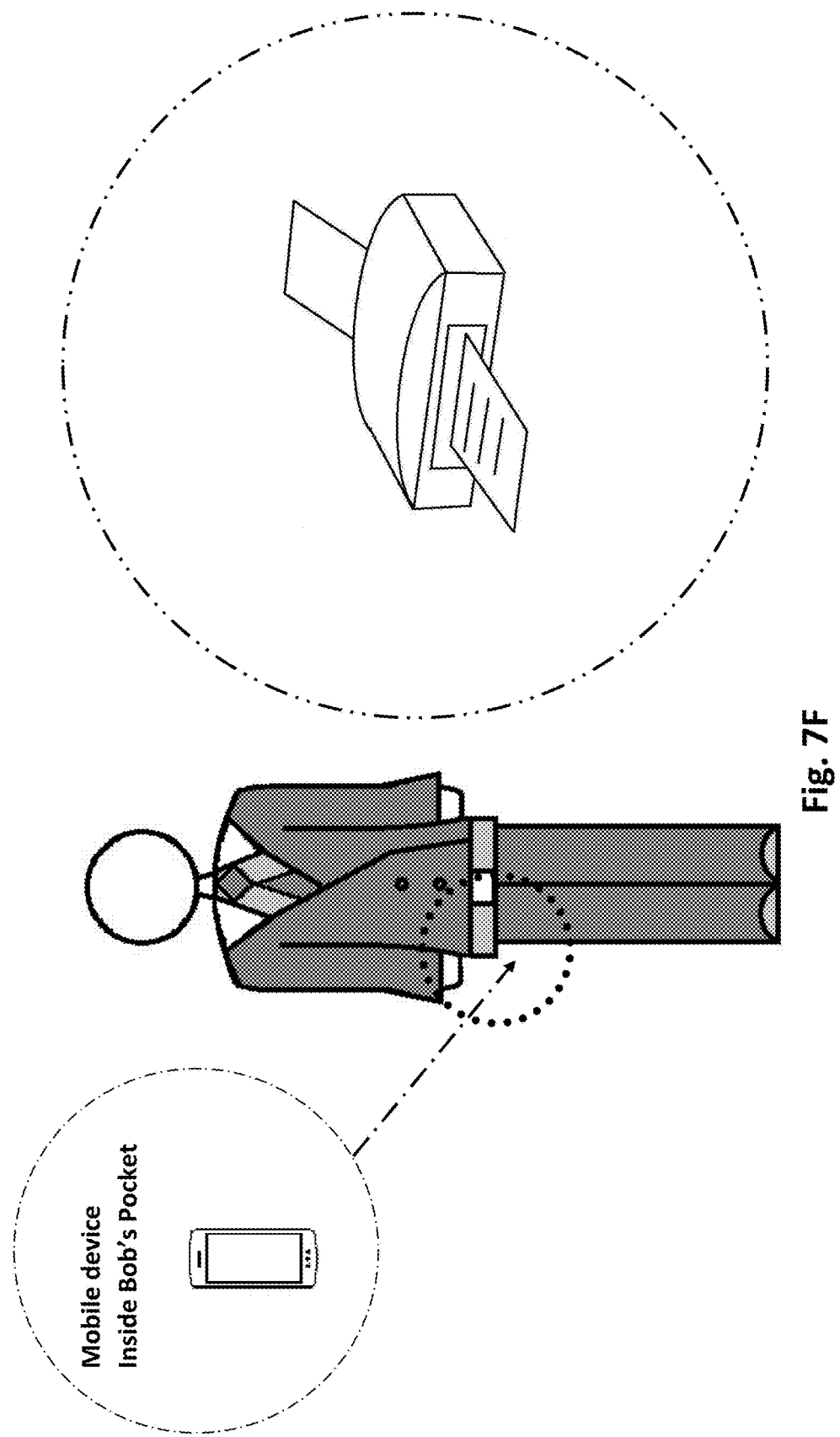

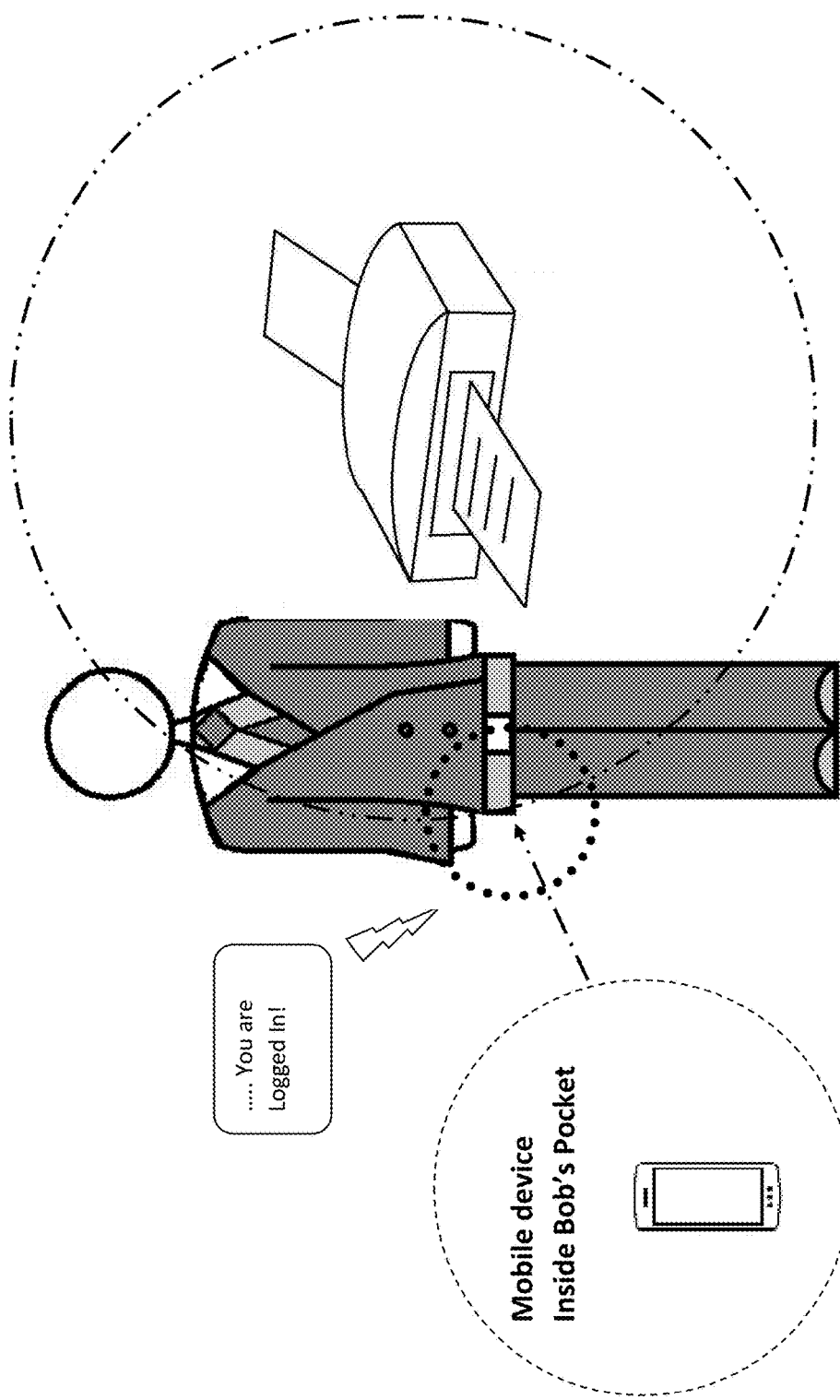

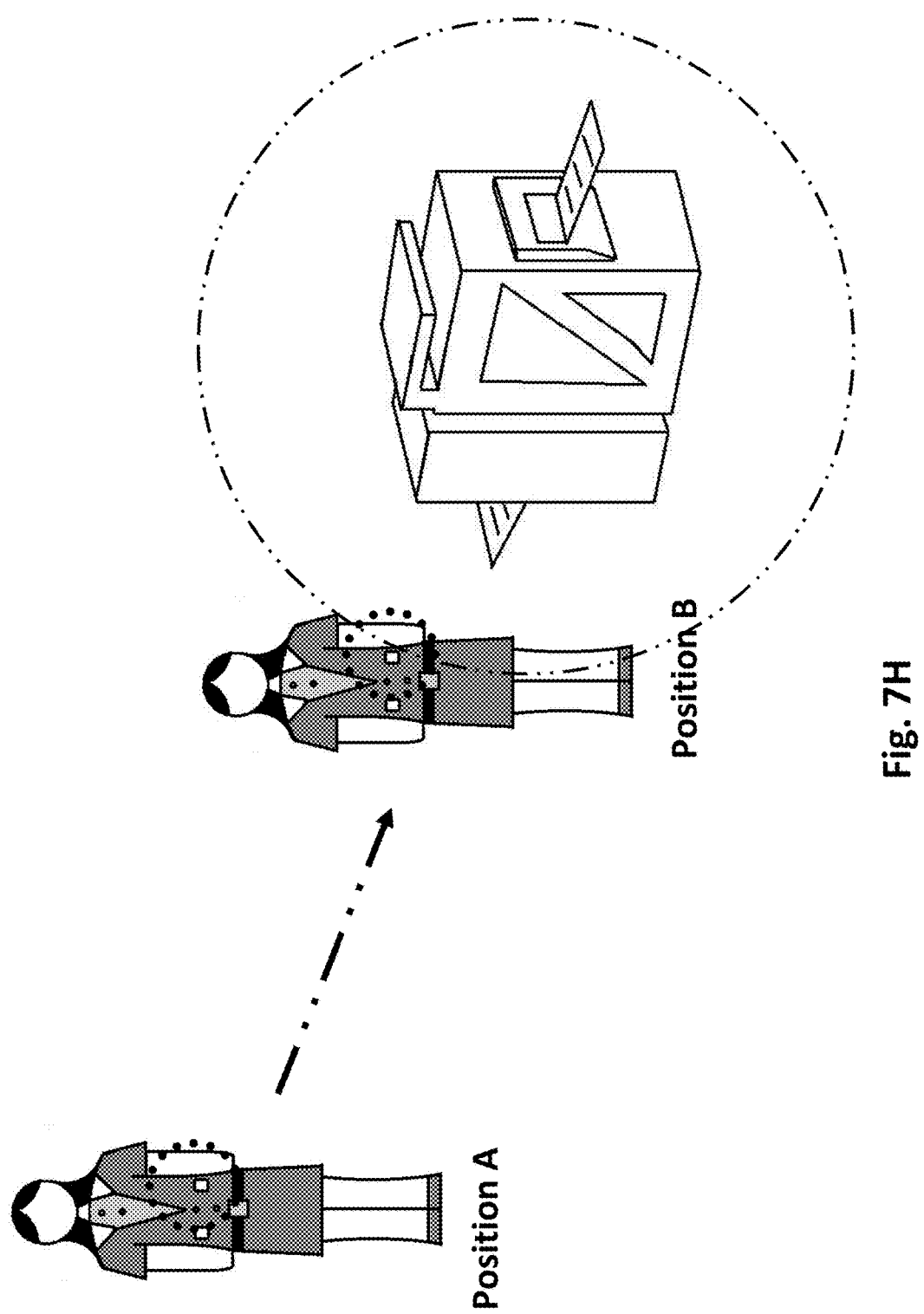

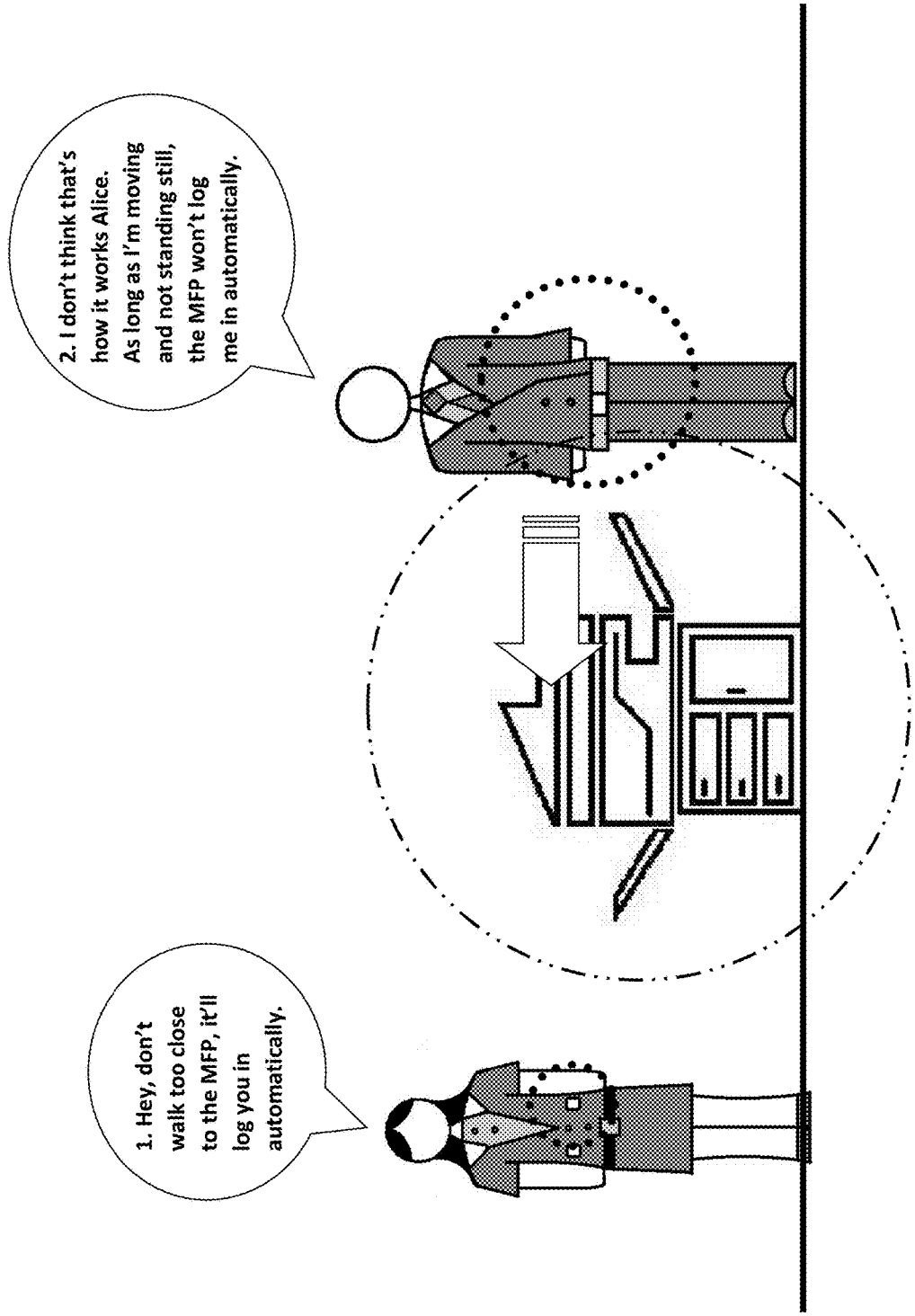

| User Priority | | |
|---|---|---|
| User | Title | Priority |
| John Johnson | CEO | 1 |
| Elizabeth Wright | CFO | 2 |
| Alice Green | Senior Manager | 3 |
| Bob Miller | Chief Engineer | 4 |
| Peter Brown | Entry Engineer | 5 |
| Mary Taylor | Secretary | 6 |
| Katherine Stewart | Secretary | 7 |

Fig. 10

SYSTEM, APPARATUS AND METHOD FOR SECURE OPERATION OF IMAGE FORMING DEVICE

TECHNICAL FIELD

This disclosure relates to an image forming apparatus and more specifically, to systems, apparatuses and methodologies for secure operation of an image forming apparatus.

BACKGROUND

While there are often discussions of the desirableness of a paperless society, in the current information age, there remains a great need by users for printing, scanning, copying functionalities, and the like. Thus, peripheral devices having such functionalities, such as printers, copiers, multi-function peripheral (MFP) devices, etc., continue to play a significant role in information technology (IT). In an office or public environment, for example, a large number of users may seek to access a relatively small number of shared devices. In many such instances, there is a need for secure services at such devices.

In order for such devices to provide secure printing, scanning and copying services at the device, a user is commonly required to be authenticated at the device (e.g., printer, MFP, etc.). Such authentication process not only identifies the user, to enable authorization and access to appropriate resources on both the output device and the network, but it also identifies the device where the user is currently located. To be secure, an authentication process typically employs two factors, one to identify the user and the second to verify his or her identity, such as consisting of a user ID and password; a proximity card and a PIN code; a PKI smart card and a PIN code; user ID, proximity card or smart card, coupled with biometric (e.g., fingerprint, facial, retinal, etc.) scan. Such provisions introduce delays and points of failure in the user operation process.

Further, with the ubiquity of mobile devices (such as smartphones and tablets), operation of such mobile devices now have a large and integrated role in the daily activities of the typical user. For example, the user interface of the user's mobile device may be employed as an equivalent to, or even a replacement for, an operation panel of an external device (e.g., appliances, vending machines, kiosks, etc.), and allows the user to operate the device using a familiar user interface on his or her own mobile device. Mobile devices are also typically carried by the user on his or her person, and secured with lock screens and mobile device management solutions to prevent unauthorized access. However, in order to utilize the services provided by the mobile device, the user needs to not only provide valid authentication but also properly identify the external device. Thus, conventional approaches that employ the mobile device for authentication have similar problems of introducing delays and points of failure, when initiating the user operation process.

An improved approach for initiating the user operation process at an image forming device is needed.

SUMMARY

Various tools (e.g., systems, apparatuses, methodologies, computer programs, etc.) are proposed herein that employ assorted capabilities of a mobile device to automate the authentication process, via automated handshake between the mobile device and the image forming (or output) device, such as by means of short-range communication by Bluetooth, or Bluetooth Low Energy (BLE), or other near field communication, or other peer-to-peer network communication, etc. In a preferred approach, complementary system components are deployed on the mobile device and image forming (or output) device, respectively [i.e. system component on the mobile device and system component on the image forming (or output) device], such that the automated handshaking is entirely transparent to the user. In such approach, the user authentication and device identification process is fully automated, reducing the need for user interaction in order to gain access to the device's functionalities, and thus speeding up access, increasing productivity and reducing user frustration.

In another aspect, operation of the device can be by using either the mobile device or the output device's operation panel, without the need to switch between two different user interfaces.

In another aspect, the user can be automatically logged out when leaving the output device, eliminating a security issue that has been pervasive with output devices (as well as other types of computing devices). Once the user moves away from the short-range operation range, and stays away for more than a predetermined length of time, the system can end the user's session automatically to prevent unauthorized users from accessing the system and the user's documents.

In an example, the output device and the user's mobile device are configured with complementary provisions for short-range communications (e.g. BLE, or similar technology that allows automatic pairing) with each other. In the general case, the mobile device and the output device are unaware of each other, while they are out of each other's short-range communication range. When the user bearing the mobile device approaches the output device, a short-range communication module (e.g., software integrated with the aforementioned system component) on the mobile device automatically detects the presence of a registered output device when it reaches the short-range communication range. However, no action is taken until the output device is within a predefined short-range operation range, as determined from the signal strength. On the other hand, once the output device is within the short-range operation range of the mobile device, the mobile device contacts the server by connecting through, e.g., a wireless or a mobile network. In another example, the communication between the mobile device and the server can optionally be performed by a connection through (via short-range communication with) the system component on the output device rather than a direct connection via wireless or mobile network. Such provision allows a server connection even if the mobile device is not permitted to join the local wi-fi network, or another wireless or mobile network.

After mutual verification of the applications (server and mobile device), the mobile device may send the server an authentication token in addition to the detected output device's address. In such arrangement, the server validates the token and provided that the token is valid, proceeds to check the output device's address. If the address is that of a valid output device, and it is not currently in use, the server confirms the access to the mobile device.

In the typical system environment, the administrator of the system systematically registers the address of each output device prior to the operation of the device or system. Such address here may be the MAC (Media Access Control), or BLE MAC, address of each device, but could also be another type of unique identifier. In an example, at predetermined time intervals (e.g., as configured by the system administrator), the mobile device connects to the server and requests the latest list of output device addresses. If the server has an updated list available, the server sends the list to the mobile device. In such arrangement, the automatic detection process can ignore devices within communication range that are not output devices or are not registered, and not contact the server until a known registered output device has been detected and is within operation range.

Further, in parallel with, or optionally before or after, the server validation of the output device address, system attempts to eliminate false positive detections (which are similar to, e.g., motion sensor-based automatic doors, which frequently open when people walk by the doors). In order to avoid this false positive, the mobile device validates that the output device is the user's destination by confirming that (a) the user has approached to within the short-range operation range, and (b) has substantially stopped moving, thus implying that the user is ready to operate the output device.

Once the identity of the output device has been confirmed, and the user has stopped within the operation range, the mobile device informs this to the server, which then initiates a user session at the output device, unlocking the output device (by server operation or by instructing the output device component) and activating the user interface on either the output device operation panel or the mobile device, as appropriate.

When first using the aforementioned system component of the mobile device, the user is requested to provide security credentials, such as, e.g., a user ID and password. The mobile device send the security credentials to the server, which in turn validates them and upon validation, the server provides the mobile device with an authentication token that can be used to access the server. The authentication token may be of time-limited validity, as configured by the system administrator, and the user may be prompted to re-authenticate from time to time. The server also records the mobile device's MAC address (or other unique identifier), and associates it with the authentication token.

The system can be configured to register a predefined short-range communication signal strength that correspond to the short-range operation range of the output device, with a typical mobile device. An adjustment factor may be applied based on output device model, either predefined or manually adjusted by the system administrator.

For example, the system determines an actual or estimated distance between the devices, based on the signal strength, and once such distance is within the aforementioned operation distance (and substantially stationary), the user can be considered to be operating the device. Additionally, the system administrator can calibrate the signal strength-to-distance mapping based on the mobile device model. In calibration mode, the system calculates the distance based on the model of the selected output device, and compares it to the actual distance entered by the administrator (and makes adjustments as necessary). Multiple calibration entries may be made to increase the accuracy of the range determination.

In another example, the detection process can be initiated and performed by the output device rather than by the mobile device. In such arrangement, once the mobile device is within the short-range operation range of the output device, the output device contacts the server and sends it the detected mobile device's address. The server validates the address, provided that it is valid and permitted to access the system. If the address is that of a valid mobile device, the server confirms this to the output device. In parallel with such validation process, the output device validates that it is the user's destination by confirming that (i) the user has approached to within the short-range operation range, and (ii) has substantially stopped moving, thus implying that the user is ready to operate the output device. Once the identity of the mobile device has been confirmed, and the user has stopped within the operation range, the output device informs this to the server, which then initiates a user session, unlocking the device and activating the user interface.

Other aspects may also be included. For example, if a user's mobile device approaches an output device while a valid session is open on the output device because another user is already using it, no automatic login can be performed. In such instance, the other user is likely still physically present, or otherwise the session would have ended (e.g., by timeout) so this login failure should not come as a surprise to the newly arrived user. The mobile device may be configured to alert both both users of the conflict on their mobile devices, using sounds, a voice message, vibration, warning lights, a message on the display or some other type of alert. When the earlier-arriving user leaves and such user's session ends, the newly arrived user can be automatically logged in, and at such time, the latter user is again alerted to ensure that he or she is aware that the output device is now available. Should multiple users have arrived during an active session, they can be automatically logged in, in sequence. The sequence could be based strictly on arrival time, or on user priority as determined by the system.

BRIEF DESCRIPTION OF THE DRAWINGS

The aforementioned and other aspects, features and advantages can be more readily understood from the following detailed description with reference to the accompanying drawings wherein:

FIG. 2B shows a table of subnets and devices, according to the embodiment of FIG. 2A;

FIGS. 7A-7I show examples of interactions between a mobile apparatus and an output device, in the system shown in FIG. 1 or in the system shown in FIG. 2A;

FIGS. 9A-9C show examples of interactions between a mobile apparatus and an output device, in the system shown in FIG. 1 or in the system shown in FIG. 2A;

FIG. 10 shows a table of user priority, according to an exemplary embodiment;

DETAILED DESCRIPTION

Figure 1:
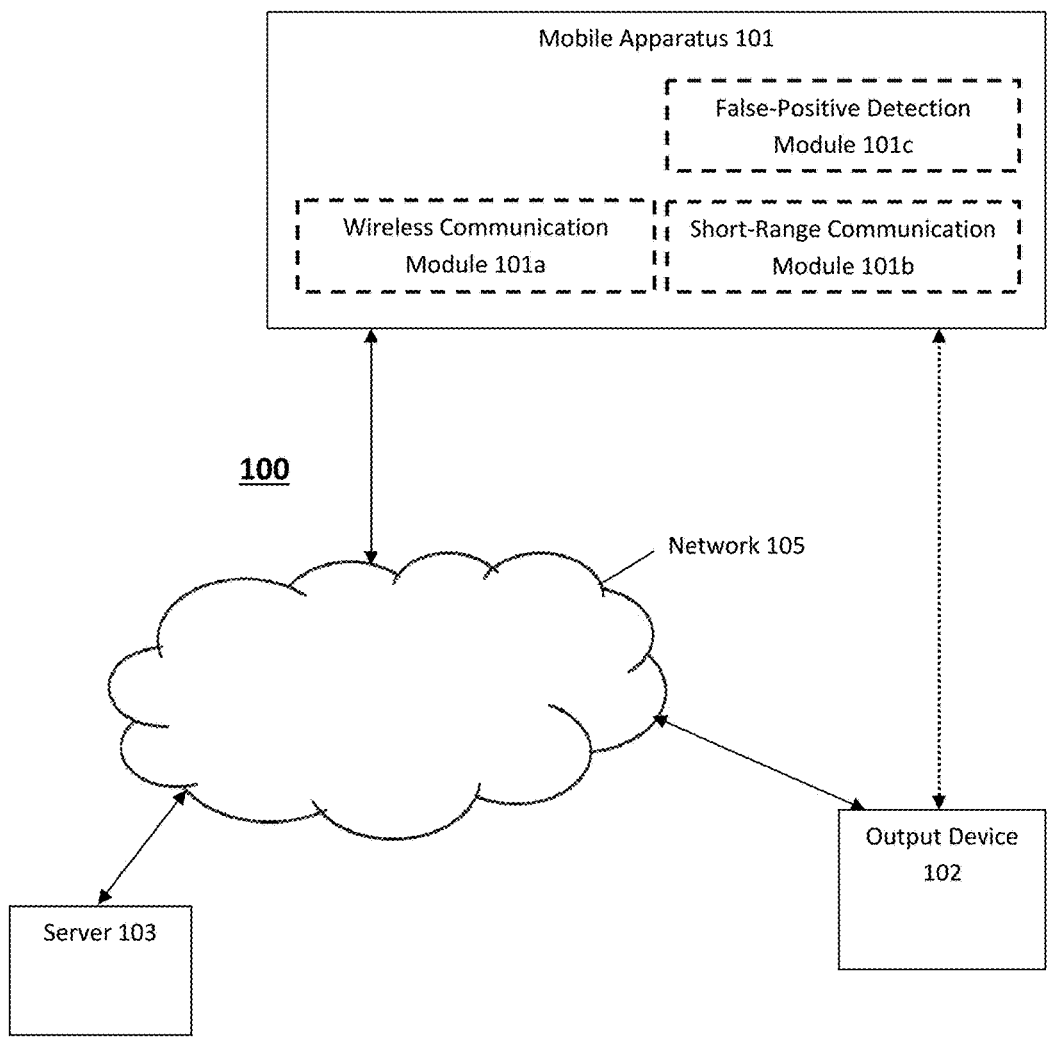
FIG. 1 shows a block diagram of a system in which a mobile apparatus and an output device are configured for secure operation, according to an exemplary embodiment.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. In addition, a detailed description of known functions and configurations is omitted when it may obscure the subject matter of the present invention.

Referring now to the drawings, wherein like reference numerals designate identical or corresponding parts throughout the several views, FIG. 1 shows schematically a system 100 that includes a mobile apparatus 101, an output device 102 and a server 103, all of which are interconnected by a network 105.

The mobile apparatus 101 can be any computing device, including but not limited to a tablet or notebook computer, a PDA (personal digital assistant), a mobile phone or handset, another mobile information terminal, etc., that can communicate with other devices through the network 105.

The wireless communication module 101a permits the mobile apparatus 101 to communicate, via the network 105 (including a wifi network and/or a mobile network), with the server 103. Such communications by the wireless communication module 101a allows a user of the mobile apparatus 101 to register the mobile apparatus 101 with the server 103 and to authenticate the user of the mobile apparatus 101 after registration is successfully performed. and the output device 102 (e.g., printer, scanner, fax machine, MFP, personal computer, notebook computer, tablet, etc.). Further, the wireless communication module 101a also allows the mobile apparatus 101 to communicate with the output device 102 through the network 109, such as to a submit an output job to the output device 102

The short-range communication module 101b allows the mobile apparatus to communicate with the output device 102 in a manner that is different from the wireless communication module 101a. The mobile apparatus 101 uses the short-range communication module 101b to communicate with the output device 102 when the output device 102 is within a short-range communication range of the mobile apparatus 101. The short-range communication range is typically shorter than the wireless communication range of the the mobile apparatus 101. In other words, even though the output device 102 may be in the wireless communication operating range of the mobile apparatus 101 (therefore, permitting the mobile apparatus 101 to facilitate communication via network 105 with the output device 102 and vice versa), the short-range communication module 101b does not commence short-range communication with the output device 102 until the output device 102 is within the short-range communication range of the mobile apparatus 101.

The false-positive detection module 101c determines whether a user of the mobile apparatus 101 intends to use output device 102 by monitoring signal strength of the output device when the output device 102 is within a short-range operation range of the mobile apparatus 101. The signal strength is compared by the false-positive detection module 102c to a standing threshold range for a predetermined time period to determine whether the mobile apparatus 101 is substantially stationary. In other words, should the signal strength be within the standing threshold range, the false-positive detection module 101c determines that the mobile apparatus 101 is substantially stationary thereby indicating that the user of the mobile apparatus 101 intends to the use output device 102. Otherwise, the false-positive detection module 101c determines that the mobile apparatus 101 is not substantially stationary thereby indicating that the user of the mobile apparatus does not intend to use the output device 102 and is merely passing by.

The output device 102 may be, for example, an MFP, a printer, a facsimile machine, a scanner, etc. Further, the terms "printer" and "printer device" are used hereinafter generically to include any output device having a printing or plotting functionality, and include multifunction devices having a copy and/or scanning functionality in addition to the printing or plotting functionality.

The server 103 may communicate with the mobile apparatus 101 to facilitate the use of the output device 102. Further, the server 103 may store a list which contains currently registered output devices that are accessible by each user whose information is stored by the server 103. For example, the mobile apparatus 101 may send an authentication token and an output device identifier to the server 103 which authenticates the received authentication token and determines whether the output device corresponding to the received output device identifier is accessible by the user. If the output device is accessible, the server 103 permits the user of the mobile apparatus 101 to utilize the output device 102. In another example, the server 103 may create an authentication token using user credentials and a media access control (MAC) received from the mobile apparatus 101. Such authentication token may be also be associated with a specific time limit. Such time limit prevents the user from being logged onto the output device indefinitely after leaving the output device.

The network 105 can be a local area network, a wide area network or any type of network such as an intranet, an extranet (for example, to provide controlled access to external users, for example through the Internet), a private or public cloud network, the Internet, etc., or a combination thereof. In addition, the network 105 preferably uses TCP/IP (Transmission Control Protocol/Internet Protocol), but other protocols such as SNMP (Simple Network Management Protocol) and HTTP (Hypertext Transfer Protocol) can also be used. How devices can connect to and communicate over networks is well known in the art and is discussed for example, in "How Networks Work", by Frank J. Derfler, Jr. and Les Freed (Que Corporation 2000) and "How Computers Work", by Ron White, (Que Corporation 1999), the entire contents of each of which are incorporated herein by reference.

Figure 2A:
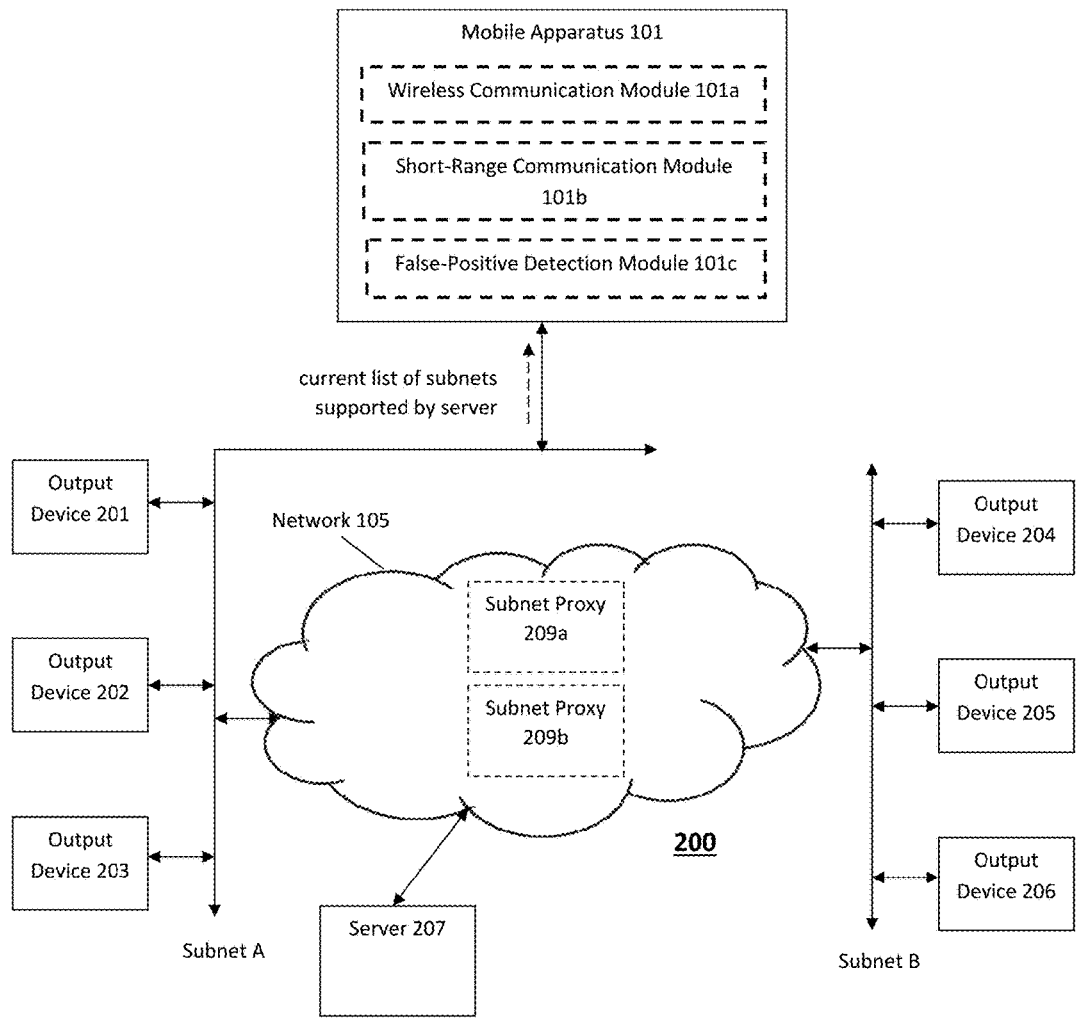
FIG. 2A shows a block diagram of a system in which a mobile apparatus and an output device are configured for secure operation, according to another exemplary embodiment.

FIG. 2A shows schematically a system 200 for providing output (e.g., print, scan, copy, fax, etc.) services, according to another exemplary embodiment. The system 200 is similar to the system 100A except that the system 200 additionally includes output devices 201-206 and subnet proxies 209a and 209b. As illustrated in FIG. 2A, each of the output devices 201-203 is connected to a subnet A and each of the output devices 204-206 is connected to a subnet B.

It should be noted that each of the output devices 201-206 is configured in a manner similar to the output device 102 and the server 207 is configured in a manner similar to the server 103.

The subnet proxy 209a (or 209b) can be a network appliance or a software implementation on any network-connected device connected to the network 105 (such as a router). The subnet proxy 209a can discover printing devices located on one or more subnets of the network 105 (such as by broadcasting a query over the subnets, referring to a directory service, etc.), and advertise print services. For example, the subnets may employ Bonjour protocol which is an implementation of Zero configuration networking using multicast Domain Name System (mDNS) service records. Such configuration allows a printer to be connected to the subnet without the need to assign it a specific IP address or manually enter that address into each computer, and the printer can be discovered by appropriate query under the protocol and the printer's network address can be automatically determined.

The server 207 may store a list of the current subnets that are in the network 105 as shown in FIG. 2B. For example, in this case, there are two subnets (i.e. subnet A and subnet B) in the network 105. Thus, the server 207 may store information in a list regarding the two subnets. Such information may include the output devices connected to each of the subnets and their corresponding BLE MAC addresses. Further, the mobile apparatus 101 may periodically download such list via the wireless communication module 101a to determine which subnet the mobile apparatus 101 is currently on. In addition, the mobile apparatus 101, may also use the subnet list to determine, via the false-positive detection module, whether a new device (within the short-range communication range of the mobile apparatus) is an output device within one of the subnets on the list.

Otherwise, operations of the elements of the system 200 are similar to those discussed in connection with corresponding elements of the system 100 of FIG. 1.

Figure 3:
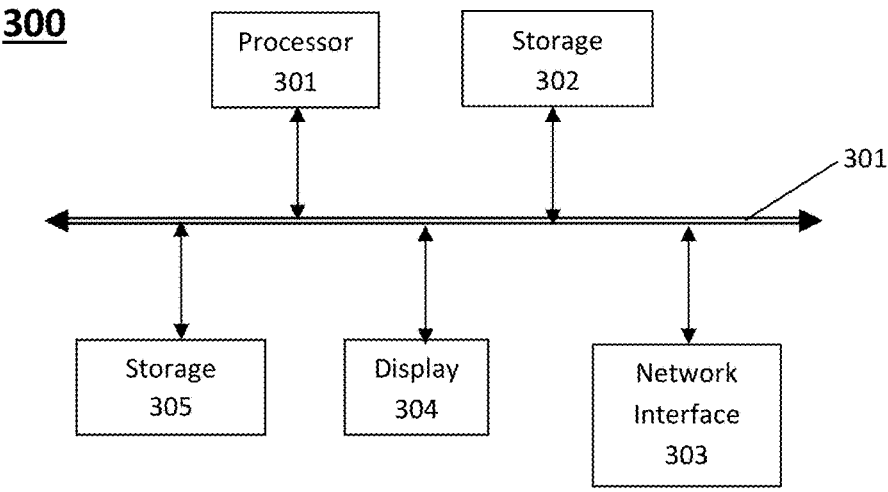
FIG. 3 shows a block diagram of an exemplary configuration of a computing device.

FIG. 3 shows an exemplary constitution of a computing device that can be configured (for example, through software) to operate (at least in part) as the server 103 of FIG. 1 and server 207 of FIG. 2A. As shown in FIG. 3, apparatus 300 includes a processor (or central processing unit) 301 that communicates with a number of other components, including memory or storage part 302, network interface 303, display 304 and other input/output (e.g., keyboard, mouse, etc.) 305, by way of a system bus 309. The processor 301, memory/storage 302, network interface 303, display 304 and input/output 305 are conventional, and therefore in order to avoid obfuscating the inventive aspects of this disclosure, such conventional aspects are not be discussed in detail herein.

The apparatus 300 includes the network interface 303 for communications through a network, such as communications through the network 105 with the server 103 of FIG. 1 and server 207 of FIG. 2A. However, it should be appreciated that the subject matter of this disclosure is not limited to such configuration. For example, the apparatus 300 may communicate with client terminals through direct connections and/or through a network to which some components are not connected. As another example, the apparatus 300 does not need to be provided by a server that services terminals, but rather may communicate with the devices on a peer basis, or in another fashion. The apparatus 300 is not limited to a server or computer, but can be manifested in any of various devices that can be configured to communicate over a network and/or the Internet.

Figure 4:
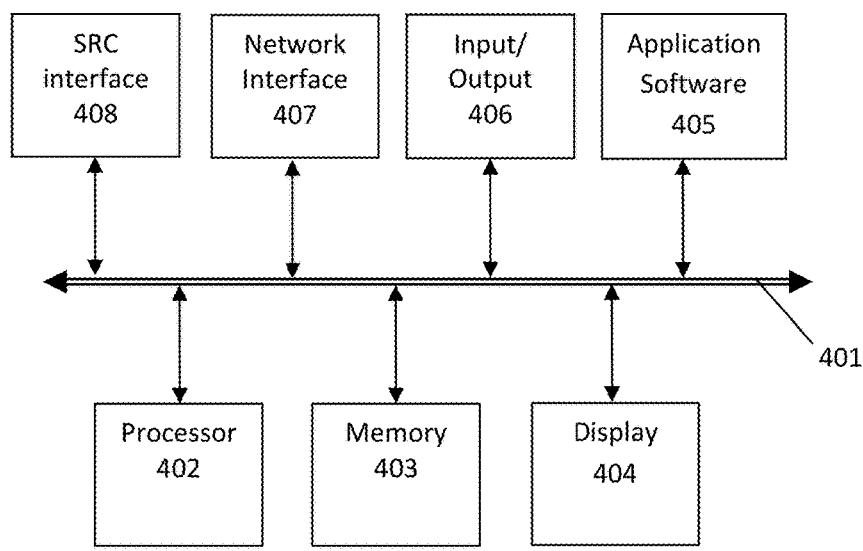
FIG. 4 shows a block diagram of an exemplary configuration of a terminal.

An exemplary constitution of the mobile apparatus 101 of FIGS. 1 and 2A is shown schematically in FIG. 4. In FIG. 4, terminal 400 includes a processor (or central processing unit) 402 that communicates with a number of other components, including memory 403, display 404, application software 405, input/output (such as keyboard, mouse, touchpad, stylus, microphone and/or speaker with voice/speech interface and/or recognition software, etc.) 406, network interface 407 and short-range communication (SRC) interface 408, by way of an internal bus 401.

The memory 403 can provide storage for program and data, and may include a combination of assorted conventional storage devices such as buffers, registers and memories [for example, read-only memory (ROM), programmable ROM (PROM), erasable PROM (EPROM), electrically erasable PROM (EEPROM), static random access memory (SRAM), dynamic random access memory (DRAM), non-volatile random access memory (NOVRAM), etc.].

The network interface 407 provides a connection (for example, by way of an Ethernet connection or other network connection which supports any desired network protocol such as, but not limited to TCP/IP, IPX, IPX/SPX, NetBEUI, etc.) to the network to which the computer 400 is connected (e.g., network 105 of FIGS. 1 and 2A).

The SRC interface 408 can be a combination of a hardware provision and a system software component constituting, e.g., a Bluetooth subsystem, an NFC (near field communication) subsystem, an infrared communication subsystem, etc. that enables the terminal 400 to conduct direct, peer-to-peer, point-to-point communication with another device having complementary SRC provisions.

Additional aspects or components of the computer 400 (and components thereof) are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J. Derfler, Jr. and Les Freed (Que Corporation 2000), the entire contents of each of which are incorporated herein by reference.

Figure 5:
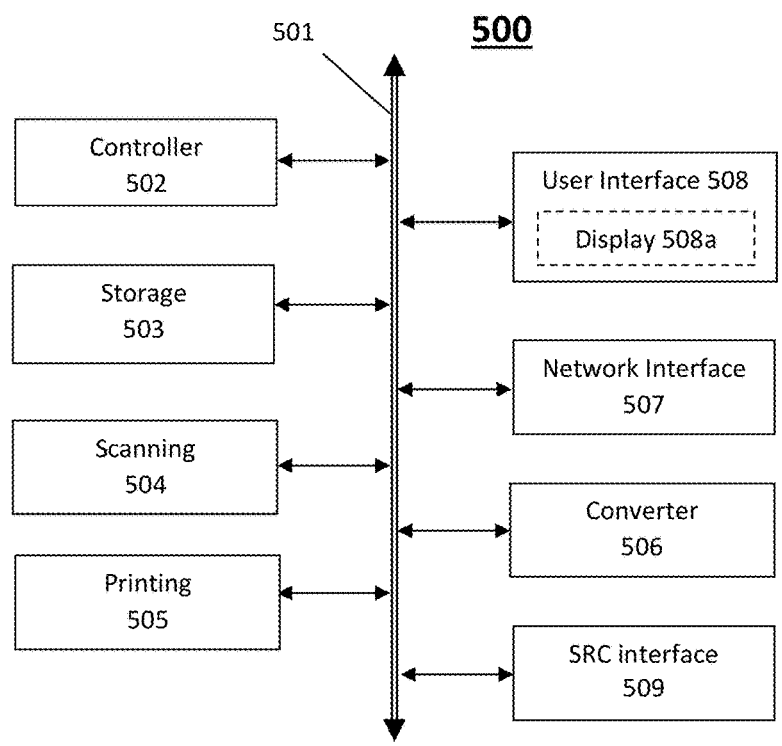
FIG. 5 shows a block diagram of an exemplary configuration of a multi-function output device.

FIG. 5 shows a schematic diagram of a configuration of an output device as an MFP (multi-function printer or multi-function peripheral), which can be any apparatus (including a microprocessor chip or a collection of devices having varying degree of integration) that has the ability to perform two or more functionalities. The output device 500 shown in FIG. 5 includes a controller 502, and various elements connected to the controller 502 by an internal bus 501. The controller 502 controls and monitors operations of the output device 500. The elements connected to the controller 502 include storage 503 (for example, random access memory, read-only memory, hard disk drive, portable storage media drive such as for optical discs, magnetic discs, magneto optical discs, etc., semiconductor memory cards, combinations of storage media, etc.), a converter 506, a network interface (I/F) 507, printing 505, scanning 504 and a user interface 508.

Storage 503 can include one or more storage parts or devices [e.g., a read only memory (for example, ROM, PROM, EPROM, EEPROM, etc.), a random access memory (RAM), a hard disk drive (HDD), portable media (for example, floppy disk, optical disc, magnetic discs, magneto-optical discs, semiconductor memory cards, etc.) drives], and program code instructions can be stored in one or more parts or devices of storage 503 and executed by the controller 502 to carry out the instructions. Such instructions can include instructions for performing specified functions (such as printing, scanning, faxing, copying, e-mailing, etc.) of the output device 500, to enable the output device 500 to interact with a terminal, as well as perhaps other external devices, through the network interface 507, and interactions with users through the user interface 508.

The network interface 507 is utilized by the output device 500 to communicate via a network with other network-connected devices such as a terminal, a server and receive data requests, print (or other) jobs, user interfaces, and etc.

The SRC interface 509 can be a combination of a hardware provision and a system software component constituting, e.g., a Bluetooth subsystem, an NFC (near field communication) subsystem, an infrared communication subsystem, etc. that enables the the output device 500 to conduct direct, peer-to-peer, point-to-point communication with another device (e.g., terminal 400) having complementary SRC provisions (e.g., SRC 408).

The user interface 508 includes one or more electronic visual displays that display, under control of controller 502, information allowing the user of the output device 500 to interact with the output device 500. The electronic visual display can be any of various conventional displays (such as a liquid crystal display, a plasma display device, a cathode ray tube display, etc.), but preferably is equipped with a touch sensitive display (for example, liquid crystal display) and is configured to provide a GUI (graphical user interface) based on information input by an operator of the output device 500, so as to allow the operator to interact conveniently with services provided on the output device 500, or with the output device 500 serving as terminal for accessing electronic data or other content through the network. User interfaces or other contents received through the network via the network interface 507 can be displayed on the display screen.

The display screen does not need to be integral with, or embedded in, a housing of the output device 500, but may simply be coupled to the output device 500 by either a wire or a wireless connection. The user interface 508 may include keys and/or buttons (such as graphical keys or buttons, or other graphical elements, of a GUI on a touchscreen display 508a) for inputting information or requesting various operations. Alternatively, the user interface 508 and the display screen may be operated by a keyboard, a mouse, a remote control, voice recognition, or eye-5 movement tracking, or a combination thereof.

Since the output device 500 is typically shared by a number of users, and is typically stationed in a common area, the output device 500 preferably prompts the user to supply login credentials or authentication information, such as user name (or other user or group information), password, access code, etc. The user credentials may be stored for the session and automatically supplied for access to other devices through the network. On the other hand, such other devices may prompt the user to supply other user credentials through the user interface.

Other methods of authentication may also be used. For example, the MFD 500 may be equipped with a card reader or one or more biometrics means (such as comparing fingerprints, palm prints, voice or speech, retinas or irises, facial expressions or features, signature, etc.). The MFD 500 may communicate the user credentials, provided in the manners discussed above, to other devices or applications connected to the MFD 210 via a network (e.g., the network 107 of FIG. 1 and FIG. 2A) for determining authorization for performing jobs.

Scanning 504, printing 505, and network interface 507 are otherwise conventional, and therefore, a detailed description of such conventional aspects is omitted in the interest of clarity and brevity. The output device 500 can have any or all of the functions of similar devices conventionally known, such as for scanning, editing and storing images, sending a fax, sending and receiving e-mails with or without attachments, accessing files by FTP or another protocol or facility, surfing the Web, scan-to-folder, scan-to-email, etc. Further, multi-functional devices or multi-function peripheral devices can play a prominent role to convert hardcopy documents to electronic documents.

Figure 6:
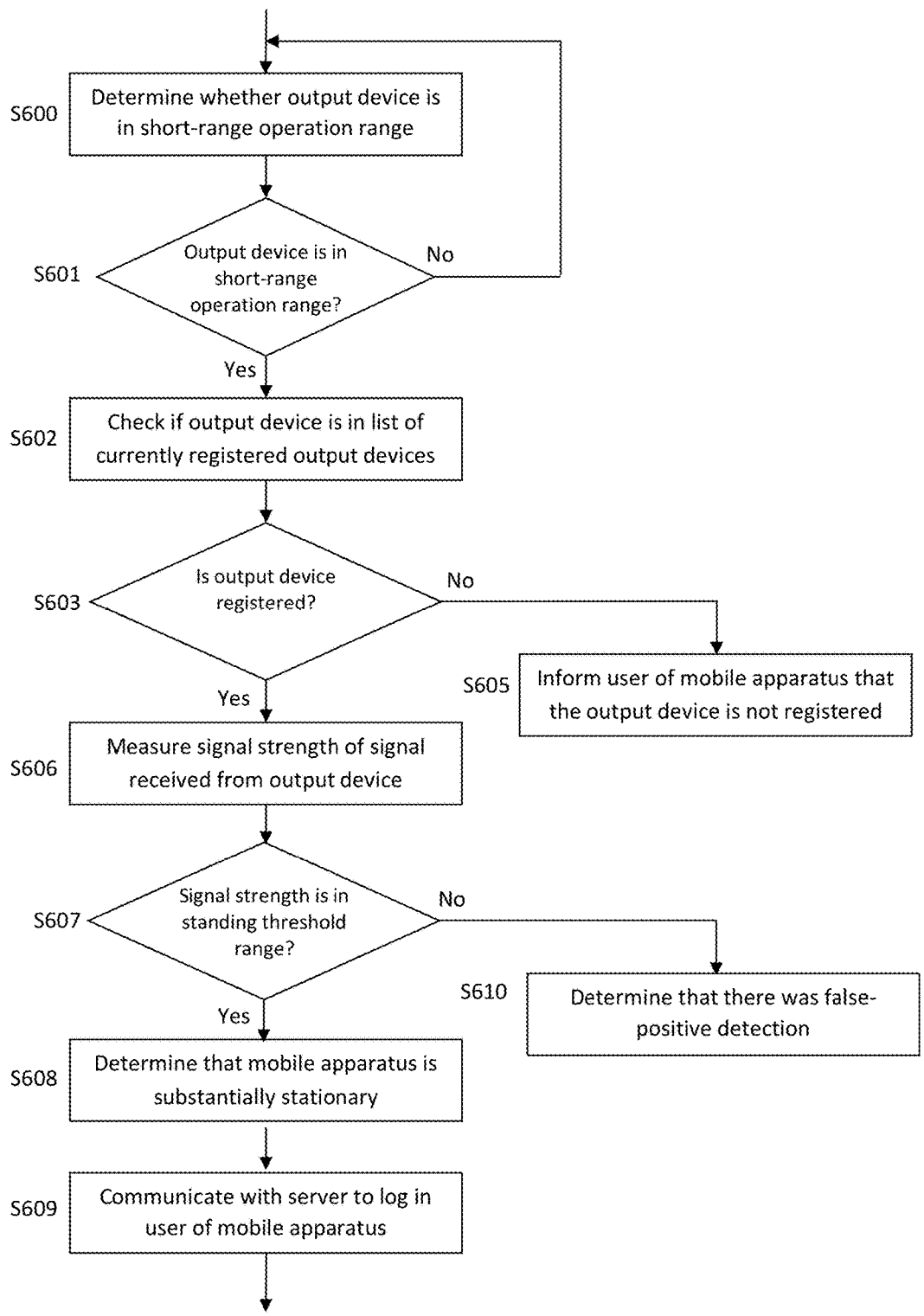
FIG. 6 shows a flow chart of a method that can be performed in the system shown in FIG. 1 or in the system shown in FIG. 2A.

FIG. 6 show a process or method performed by a mobile apparatus (e.g., 101), according to an exemplary embodiment.

Figure 7A:
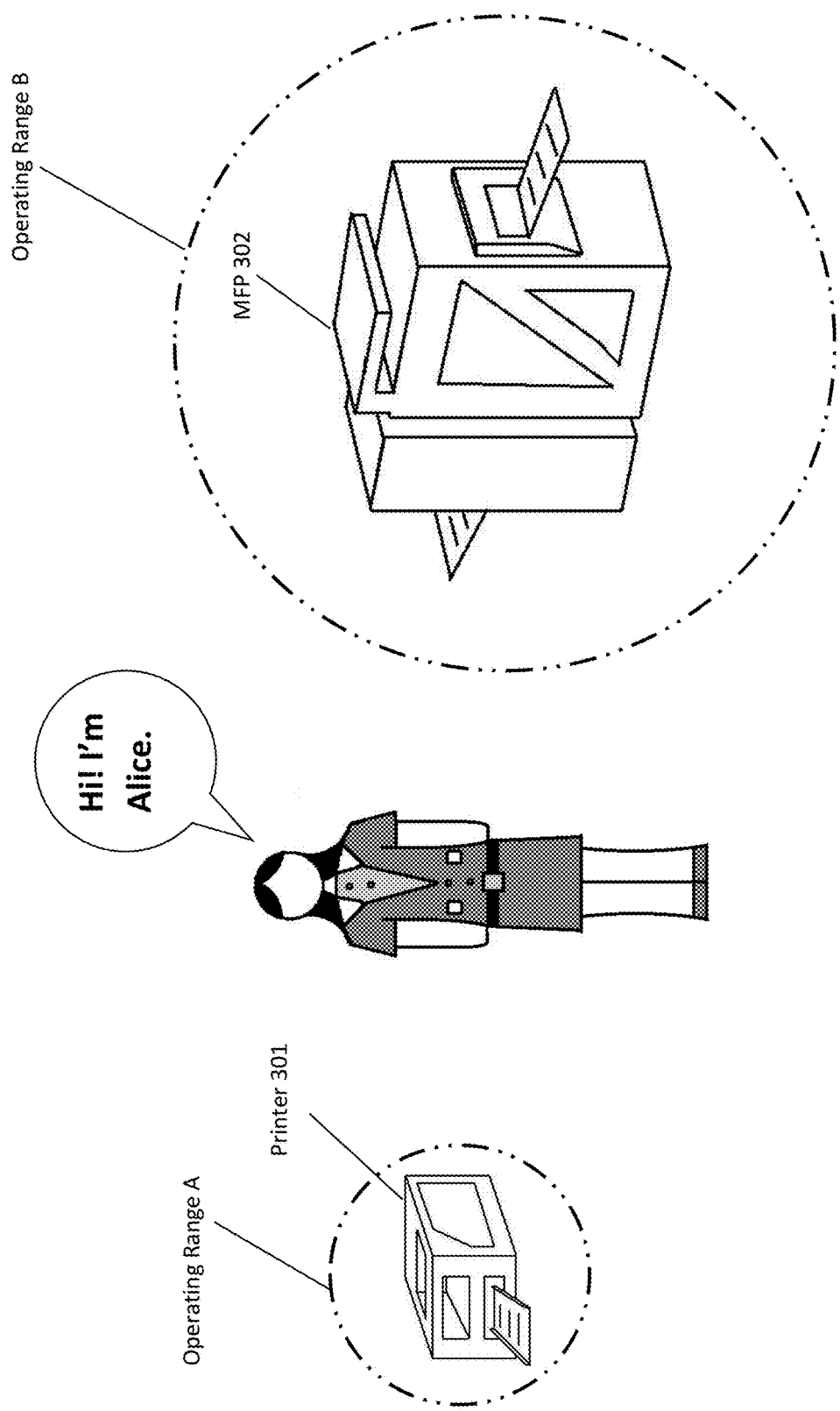

"Alice" and "Bob" may be two employees working at an organization which utilizes the system (e.g., system 200 shown in FIG. 2A) for facilitating use of various output devices in the organization. Each output device (e.g., MFPs, printers, fax machines, scanners, etc) may communicate wirelessly with other output devices when an operating range of the other output devices overlap with an operating range of the device. As can be seen in FIG. 7A, the devices (when compared to "Alice") each have different operating ranges due to the fact that each type of the output devices may have different properties (e.g., different sizes and shapes). Thus, in the case that the operating range of the output device is uniform, problems and issues may occur.

For example, having a large detection region of the output device for a plurality of small printers lined up adjacent to each other may cause each of the respective operating range of the output devices to overlap. Thus, when a mobile apparatus enters the overlapped operating ranges of the output devices, there is confusion as to which specific small printer a user of the mobile device intends to use. On the other hand, in another example, having a small operating range of the output device causes problems as well. If a large MFP device has a long length (e.g., 6 feet), a user may be constantly logged out of the system when he or she moves from one end of the large MFP device to another. Of course, it should be noted that the operating range of each of the devices may not necessarily be fixed by the manufacturer of the output device. Instead, an administrator can change the operating range. Further, it should also be noted that the user (e.g., "Bob" or "Alice") may not be able to utilize functions of the output device without logging into the output device via a server.

Figure 7B:
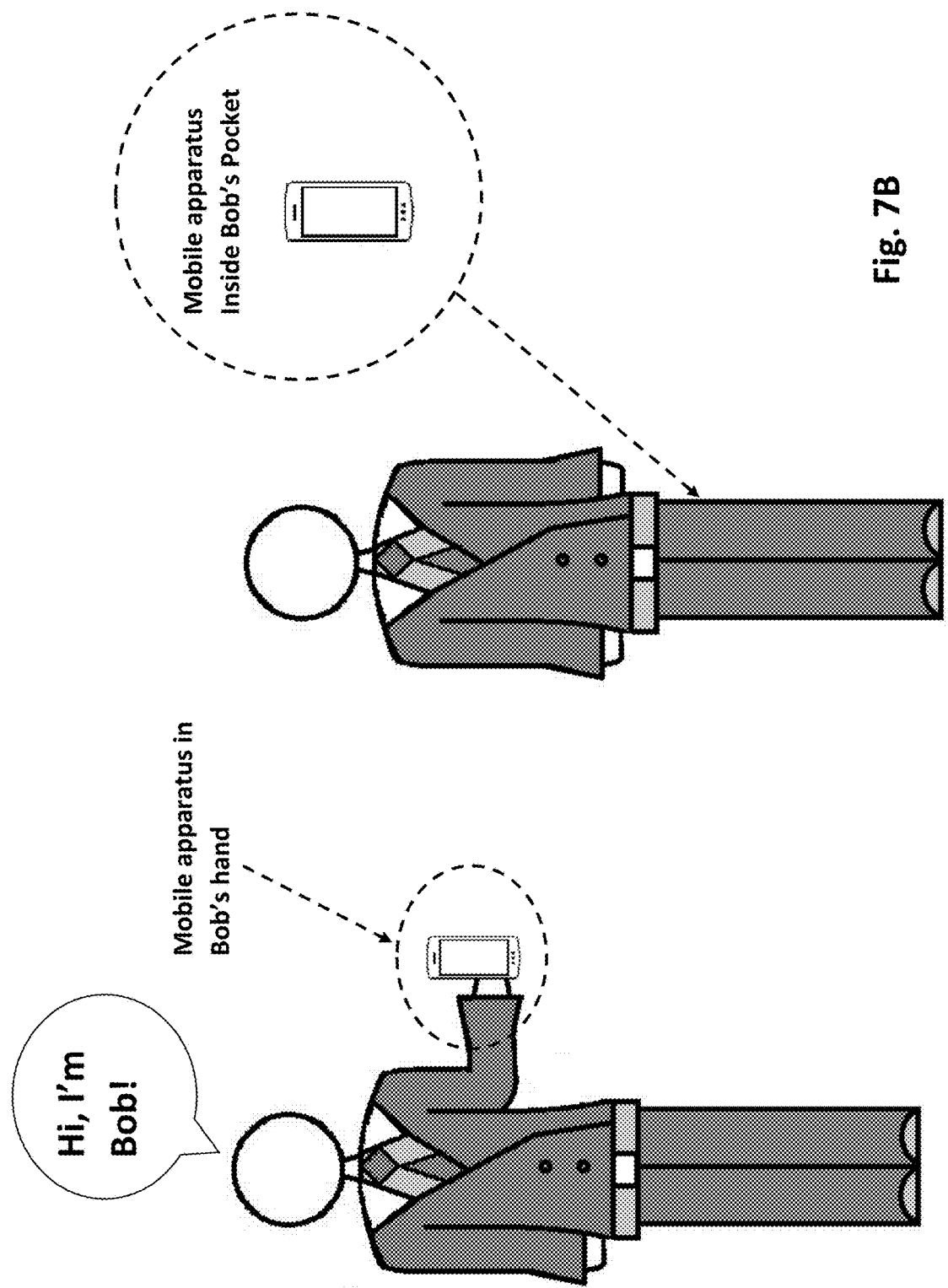

"Alice" or "Bob" may also each possess a mobile apparatus (e.g., smartphone, tablet, etc.). Such mobile apparatus may be carried by "Bob" in his hand or may be placed in his pocket as shown in FIG. 7B. Like the output devices, the mobile apparatus may include an operating range as well. Such operating range of the mobile apparatus is similar to the operating range of the output devices in that when the operating range of the mobile apparatus overlaps with an operating range of an output device or another mobile apparatus, each can perform communication with each other. In other words, the mobile apparatus can register presence of and communicate with an output device when the mobile apparatus is within the operating range of the output device. For example, each of the operating ranges may be Bluetooth ranges which allows automatic pairing when both of the detection regions overlap.

Figure 7C:
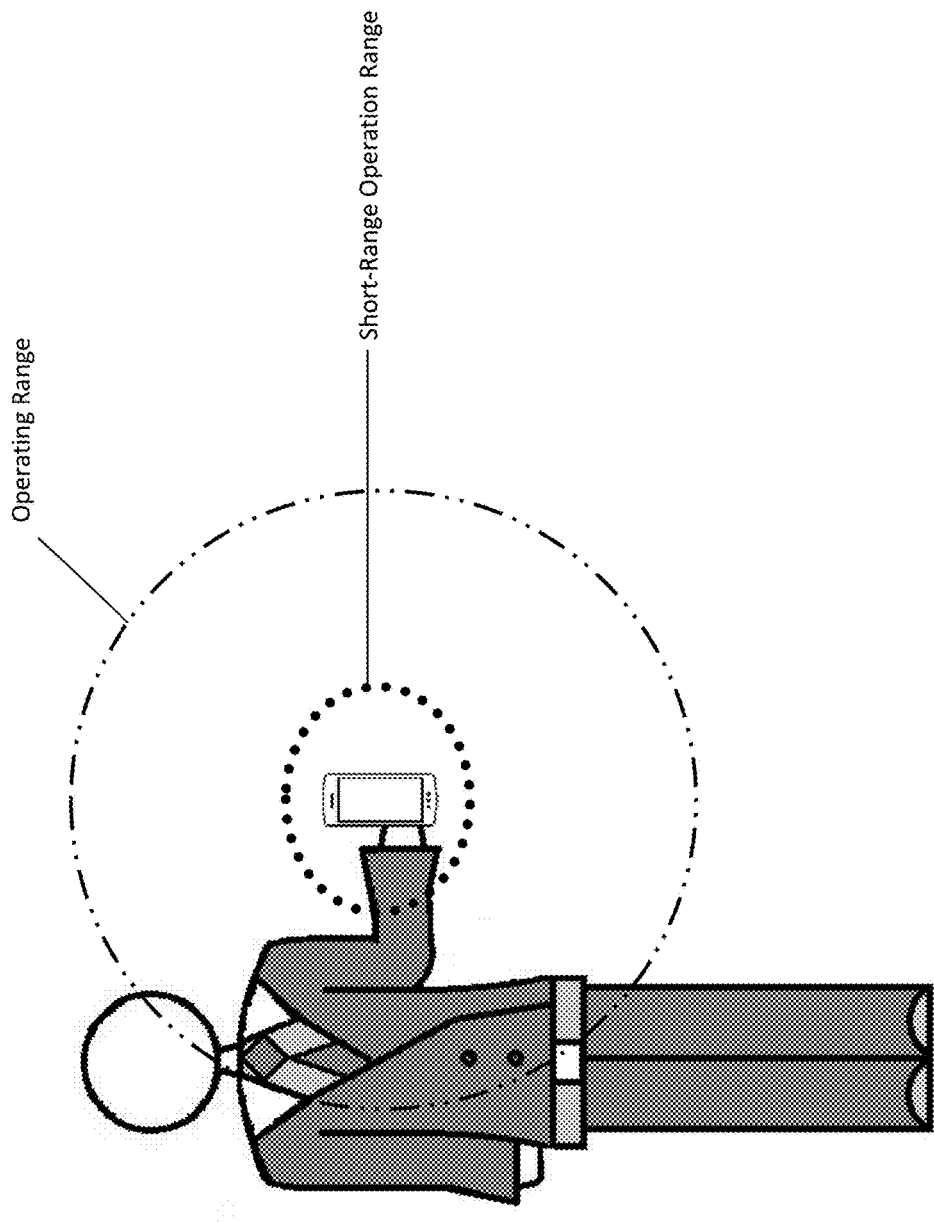

In addition, the mobile apparatus may also allow the user "Bob" (or "Alice") to log into an output device automatically via the mobile apparatus. In other words, the user "Bob" is not required to manually input his user credentials onto the output device to log in. Instead, "Bob" may simply move to a position of close proximity to the output device to cause the mobile apparatus to detect the output device thereby permitting "Bob" to be logged into the output device. For example, close proximity is defined by whether the output device is within a short-range operation range of the mobile apparatus. The short-range operation range is different from the operating range in that the short-range operation range may be smaller than the operating range, as shown in FIG. 7C. Stated another way, even if the output device is within the operating range of the mobile apparatus, the mobile apparatus does not log the user in, and instead waits for the output device to be in the short-range operation range of the mobile apparatus.

Figure 7D:
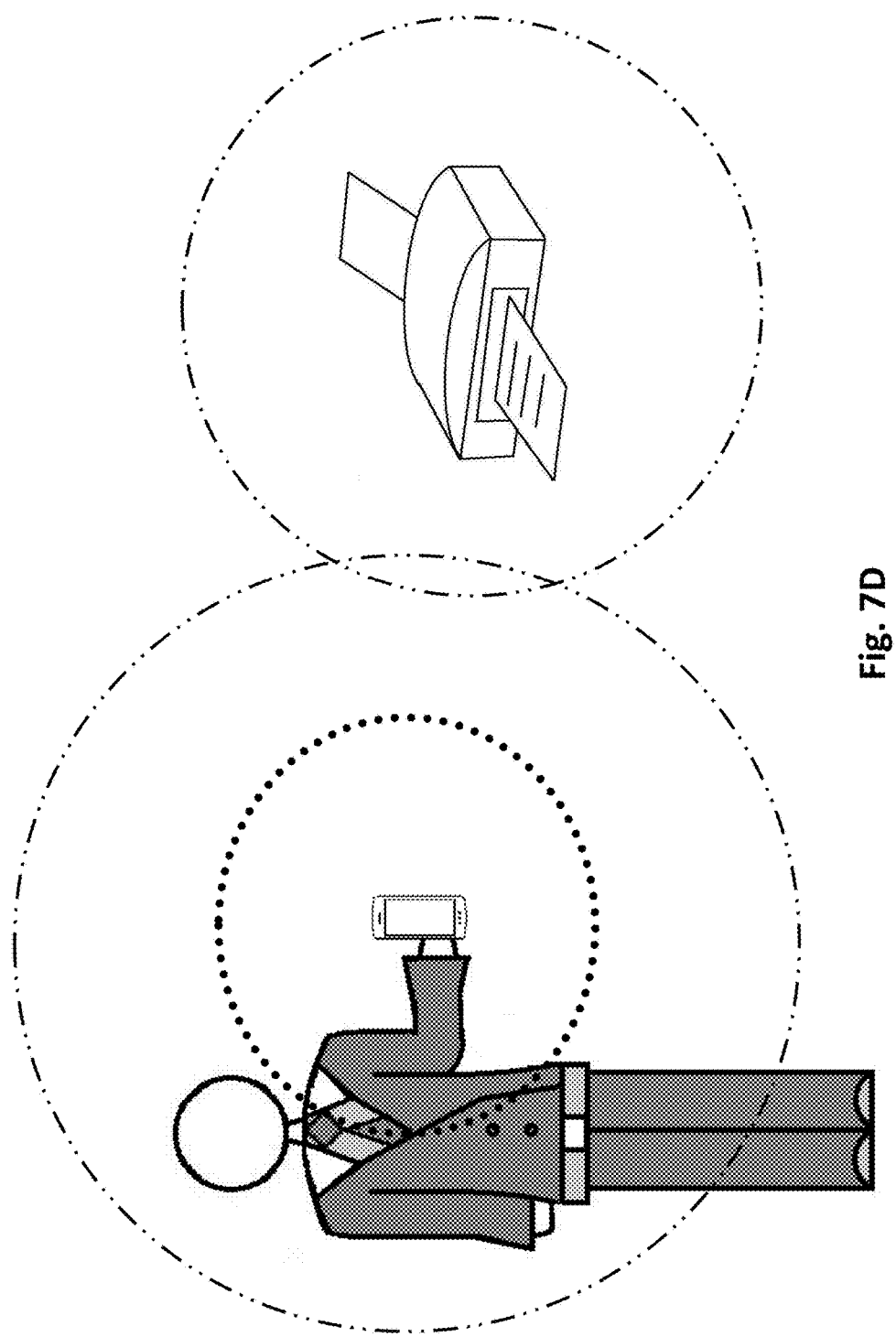
Figure 7E:
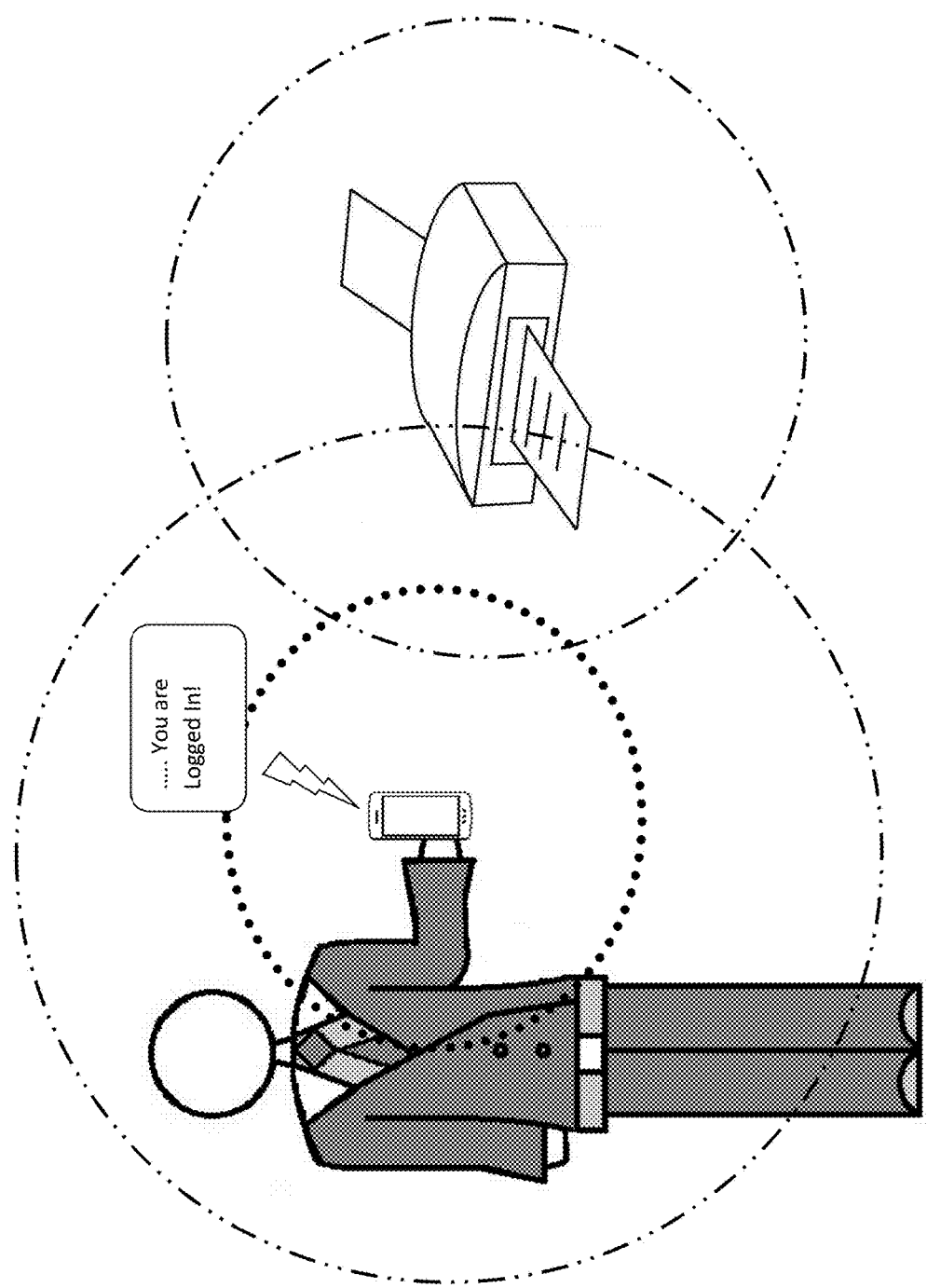

For example, as shown in FIG. 7D, the output device is within the operating range of the mobile apparatus belonging to "Bob". However, the mobile apparatus does not log "Bob" in because the output device is not within the short-range operation range of the mobile apparatus. Once "Bob" moves closer to the output device to a point in which the output device is within the short-range operation range of the mobile apparatus, does the mobile apparatus log "Bob" in, as shown in FIG. 7E.

In another example, the user is not required to hold the mobile apparatus in his or her hand. So long as the mobile apparatus is disposed somewhere on the user, he or she may simply log in and use the output device without ever interacting with the mobile apparatus. Such scenario is shown in FIG. 7F, in which the mobile apparatus is inside "Bob's" pocket. Thus, when the mobile apparatus is moved by "Bob" to a point in which the output device is within the short-range operation range of the mobile apparatus, the mobile apparatus logs "Bob" into the output device, as shown in FIG. 7G.

However, it is important to note that it is not enough to have the output device be within the short-range operation range of the mobile apparatus for the user to log into the output device. The mobile apparatus must be substantially stationary as well. Otherwise, if there was no provision to have the mobile apparatus be substantially stationary, every mobile apparatus (i) moving past the output device and (ii) having its short-range operation range being within the range of the output device, would unintentionally log the user of said mobile apparatus, even though the user of said mobile apparatus may not intend to the user output device.

Thus, to determine whether a user of a mobile apparatus intends to use an output device, the mobile apparatus first determines whether the output device is within a short-range operation range of the mobile apparatus (step S600). In the case that the output device is not in the short-range operation range of the mobile apparatus (step S601, no), the mobile apparatus repeats the determination. Otherwise, in the case that the output device is within the short-range operation range of the mobile apparatus (step S601, yes), the mobile apparatus determines if the output device is in a list of currently registered output devices (step S602). For example, one method of checking involves the mobile apparatus periodically downloading, from a server, a list of output device that are accessible by said mobile apparatus. In the case that the output device is not registered (step S603, no), the mobile apparatus may inform the user of the mobile apparatus that the output device is not registered (step S605).

On the other hand, after examining the list of currently registered output devices, the mobile apparatus may determine that the output device is registered (step S603, yes). As a result, the mobile apparatus measures the signal strength received from detection of the output device (step S606). Then, the mobile apparatus compares the output device signal strength to a standing threshold range (step S607). The standing threshold range may be a predetermined range that is set by a manufacturer of the mobile apparatus or an IT administrator.

In the case that the signal strength is within the standing threshold range (step S607, yes), the mobile apparatus determines that it is substantially stationary (step S608). Subsequently, the mobile apparatus communicates with a server to log a user into the output device (step S609). For example, "Alice", initially at position A, intends to use an MFP (i.e. output device) as shown in FIG. 7H. As a result, "Alice, while having her mobile apparatus in her pocket, walks towards the MFP in such a manner that the MFP is within the short-range operation range of the mobile apparatus and stands substantially stationary as position B. The mobile apparatus determines that she is substantially stationary by measuring the signal strength from the output device and comparing the received signal strength to a standing threshold range.

Figure 7I:
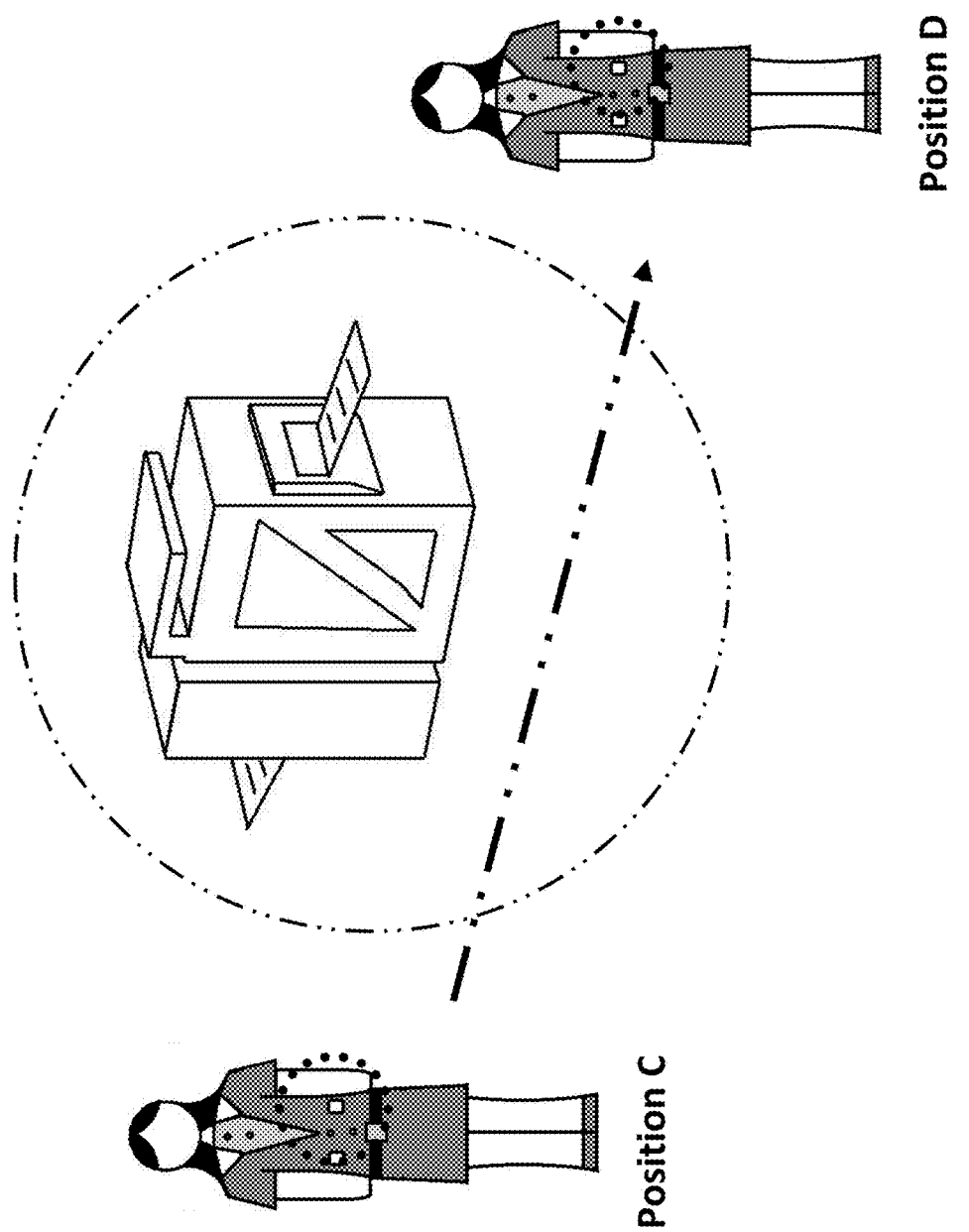

However, in the case that the signal strength is not within the standing threshold range (step S607, no), the mobile apparatus determine that there was a false-positive detection (step S010). In other words, the false-positive detection means that the user of the mobile apparatus does not intend to use the output device. Instead, it is possible that the user may merely be walking past the output device. For example, "Alice" may be walking down the hallway to a meeting. At position C, Alice is nearing an MFP that is accessible by her mobile apparatus, as shown in FIG. 7I. Thus, after walking from position C to position D the output device starts to be in the short-range operation range of her mobile apparatus. However, since "Alice" is constantly moving (i.e. not substantially stationary), the signal strength received from the output device is not within the threshold. As a result, there was false-positive detection.

Figure 8:
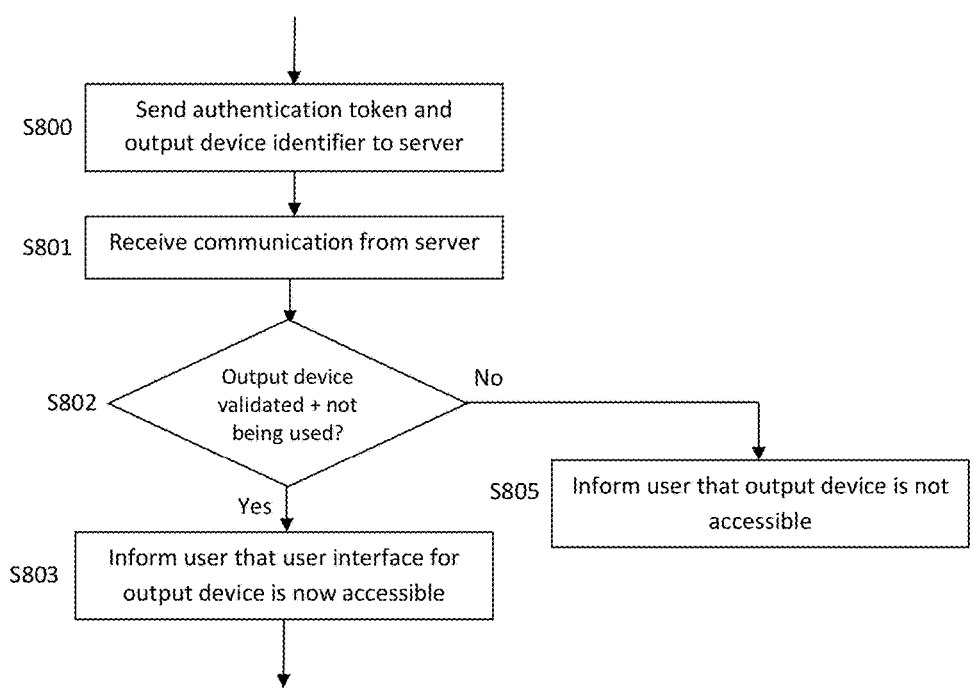
FIG. 8 shows a flow chart of a method that can be performed in the system shown in FIG. 1 or in the system shown in FIG. 2A.

FIG. 8 show a process or method performed by a mobile apparatus (e.g., 101), according to an exemplary embodiment.

After the mobile apparatus has determined that a user of the mobile apparatus is substantially stationary, the mobile apparatus sends an authentication token (including user credentials and MAC address of the mobile apparatus) and an output device identifier (including MAC address or unique address of output device) to a server (step S800). In response, the server authenticates the user. Further, the server determines (i) whether the output device is accessible by the user by referring to a list of currently registered output devices and (ii) whether the output device is being used by another user. It should be noted that the determination made in (i) is not a problem when only one user attempts to access the output device. For example, as shown in FIG. 9A, there may be two users near the output device. However, since only one user is walking past the output device (i.e. false-positive detection) and therefore intends not to use the output device, there is no problem either.

Figure 9B:
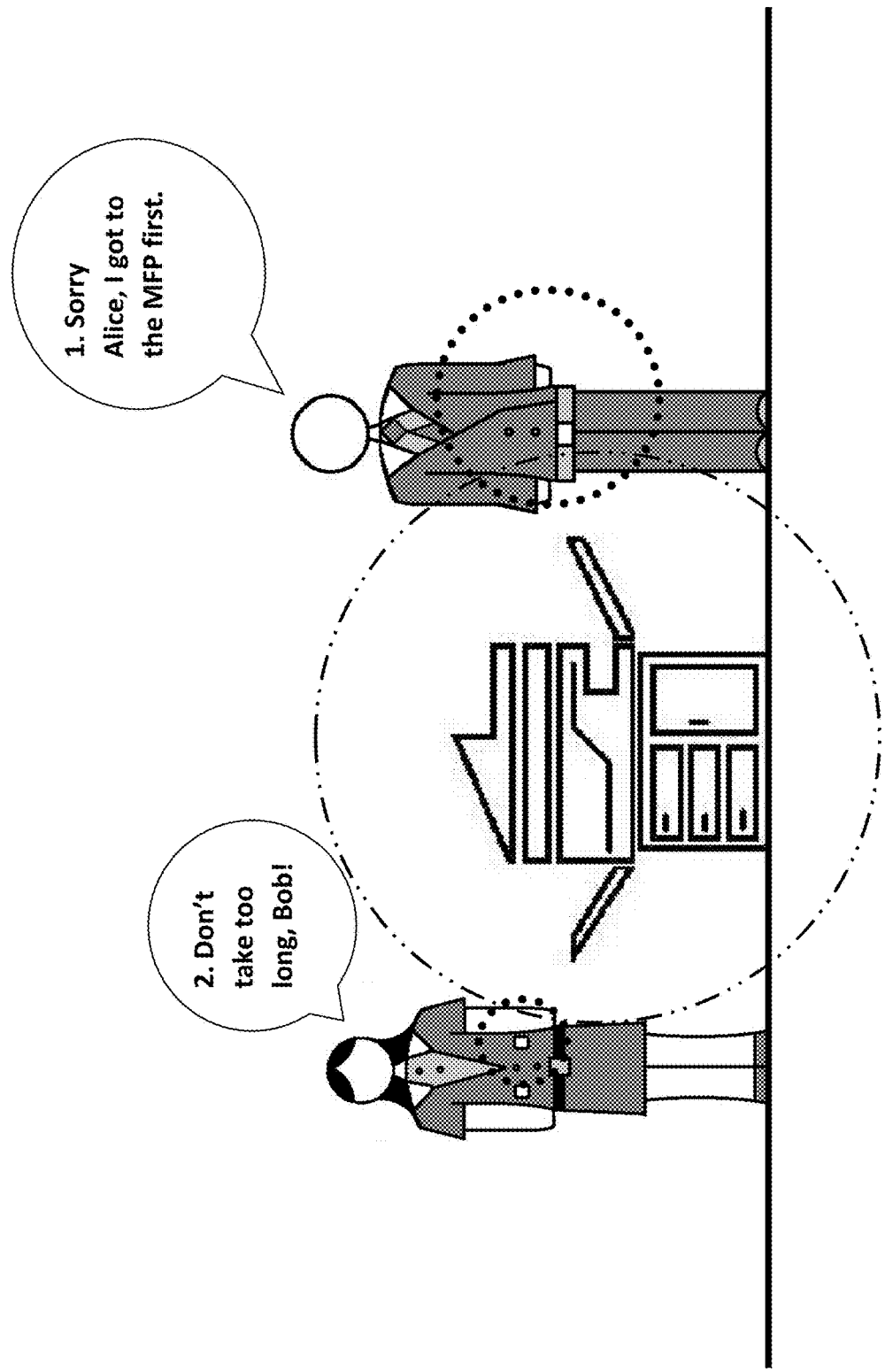

However, there may be conflict when two users attempt to use the output device simultaneously. Stated another way, two users may have the output device within the short-range operation range of their mobile apparatuses. Thus, in this case, the server informs the user who reaches the output device first that he or she gets to use the output device. On the other hand, after receiving the authentication token and the output device identifier from the second user, the server determines that output device is being used by the first user. For example, as shown in FIG. 9B, the first person, in this case "Bob", to reach the output device (in this case, an MFP) is given priority.

Figure 9C:
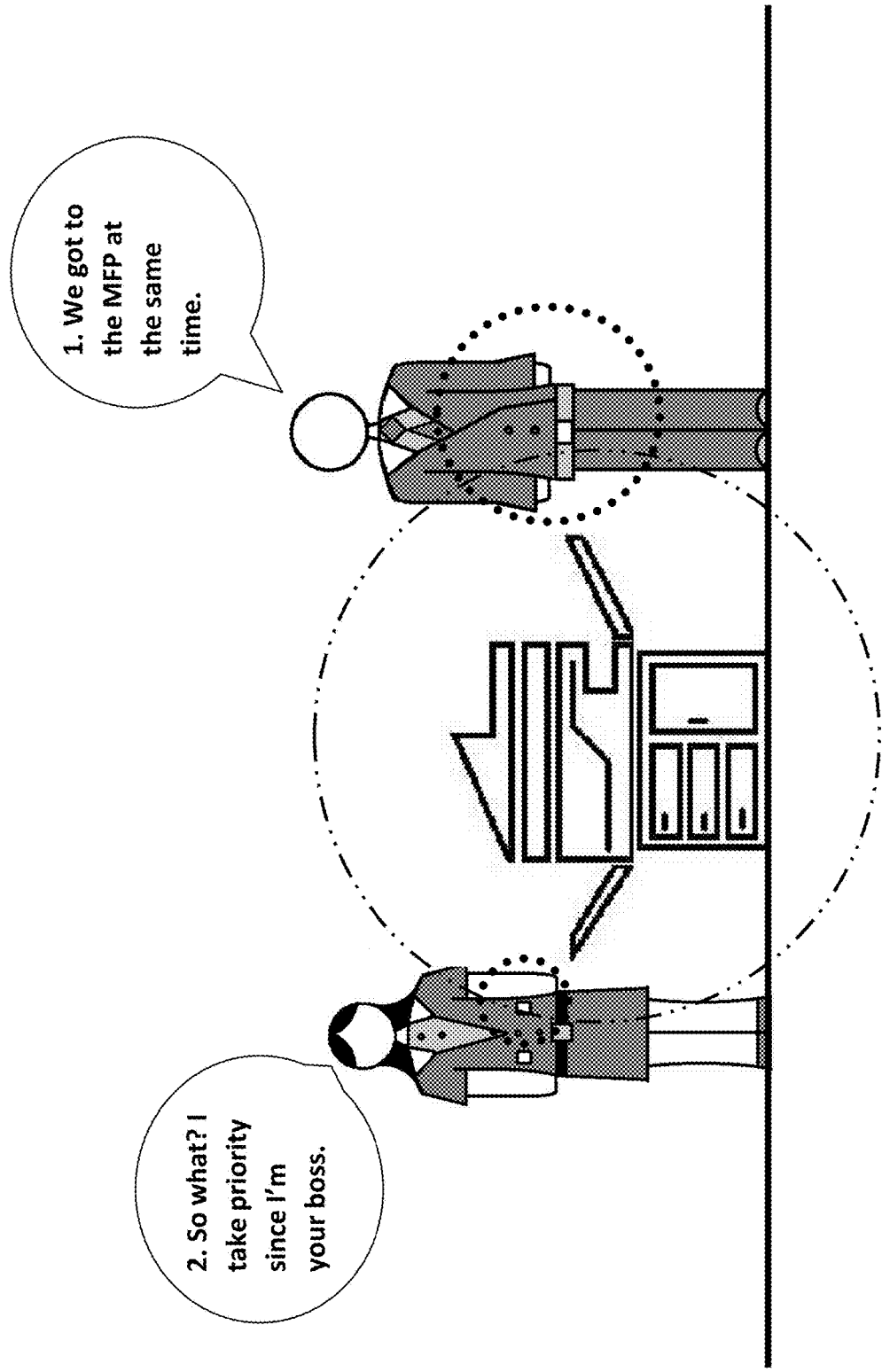

In an exemplary embodiment, it may be that both users reach the output device simultaneously. In such a case, the user with a higher priority (e.g., set by an administrator) may be permitted first access to the output device. For example, as shown in FIG. 9C, both "Alice" and "Bob" reach the output device at the same time. However, as "Alice" possesses a higher priority due to her status as "Senior Manager" (i.e. priority rank 3), as shown by the table in FIG. 10, which is in contrast to "Bob's" lower priority due to his position as "Chief Engineer" she gets first access.

Figure 11:
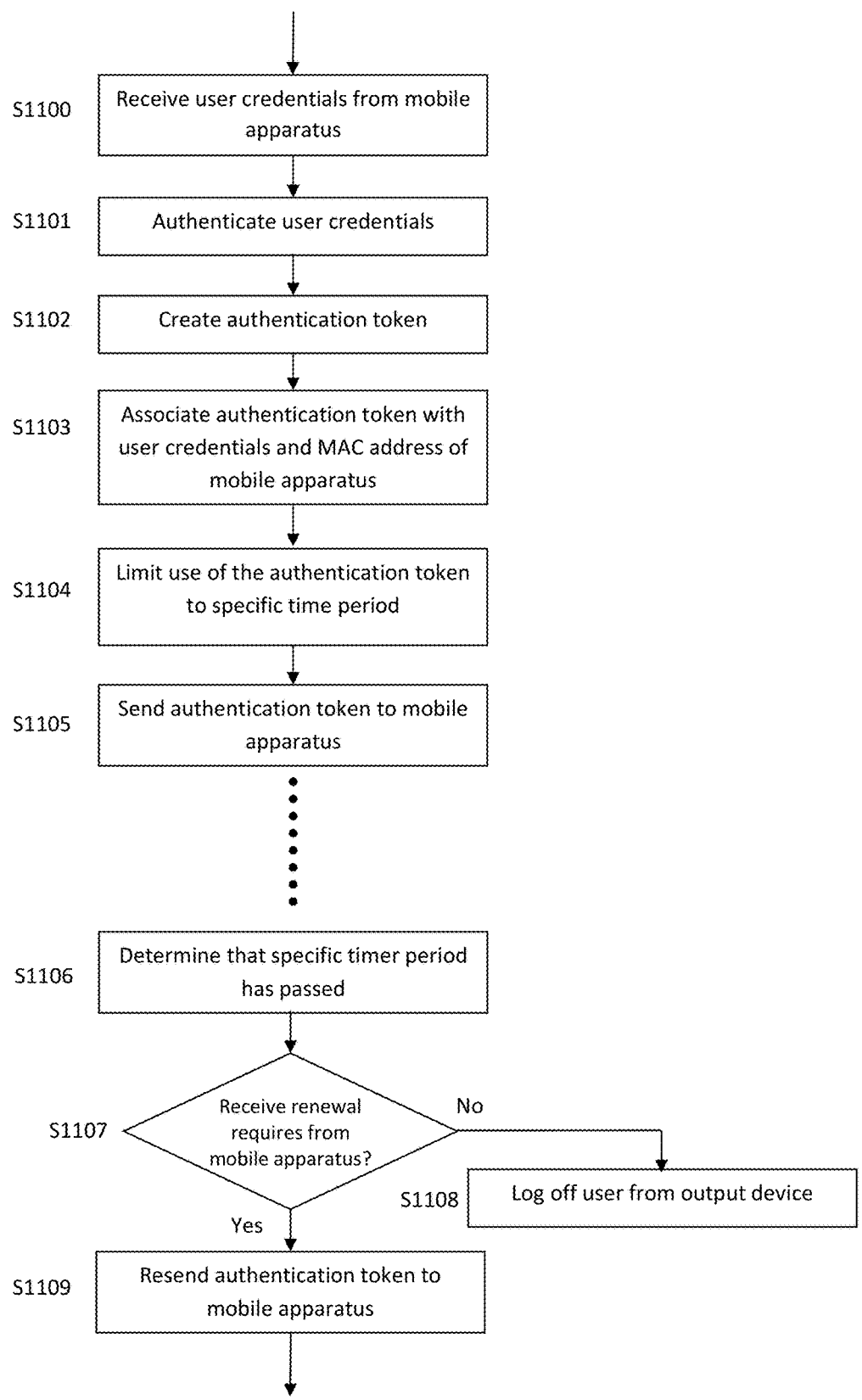
FIG. 11 shows a flow chart of a method that can be performed in the system shown in FIG. 1 or in the system shown in FIG. 2A.

FIG. 11 show a process or method performed by a server (e.g., 103), according to an exemplary embodiment.

After the mobile apparatus has determined that a user of the mobile apparatus is substantially stationary, the server receives user credentials from the mobile apparatus to request access to an output device (step S1100). Next, the server authenticates the user credentials (step S1101) and proceeds to create an authentication token (step S1102). Subsequently, the server associates the authentication token with the previously received user credentials and a MAC address of the mobile apparatus (step S1103). Then, the server limits use of the authentication token to a specific time period (step S1104). The specific time period specifies a length of time that the user of the mobile apparatus can use the output device. In other words, once the specific time period has passed, the user is logged off from the output device. Next, the server sends the authentication token to the mobile apparatus (step S1105).

After the server determines that the specific time period has passed (step S1106), the server checks whether a renewal request was sent by the mobile apparatus (step S1107). The renewal request is sent by the mobile apparatus to request that the server permit the user of the mobile apparatus an addition time period (e.g., session) to use the output device for a while longer. Such renewal request is sent automatically when, for example, (i) the mobile apparatus is still substantially stationary, (ii) the output device is still within the range of the short-range operation range of the mobile apparatus, and (iii) the user has not logged off the output device. In the case that the renewal request is received by the server (step S1106, yes), the server resends the authentication token to the mobile apparatus. In an exemplary embodiment, the resent authentication token may include minor differences from the previously sent authentication token. Such differences may include a longer specific time period.

Figure 12:
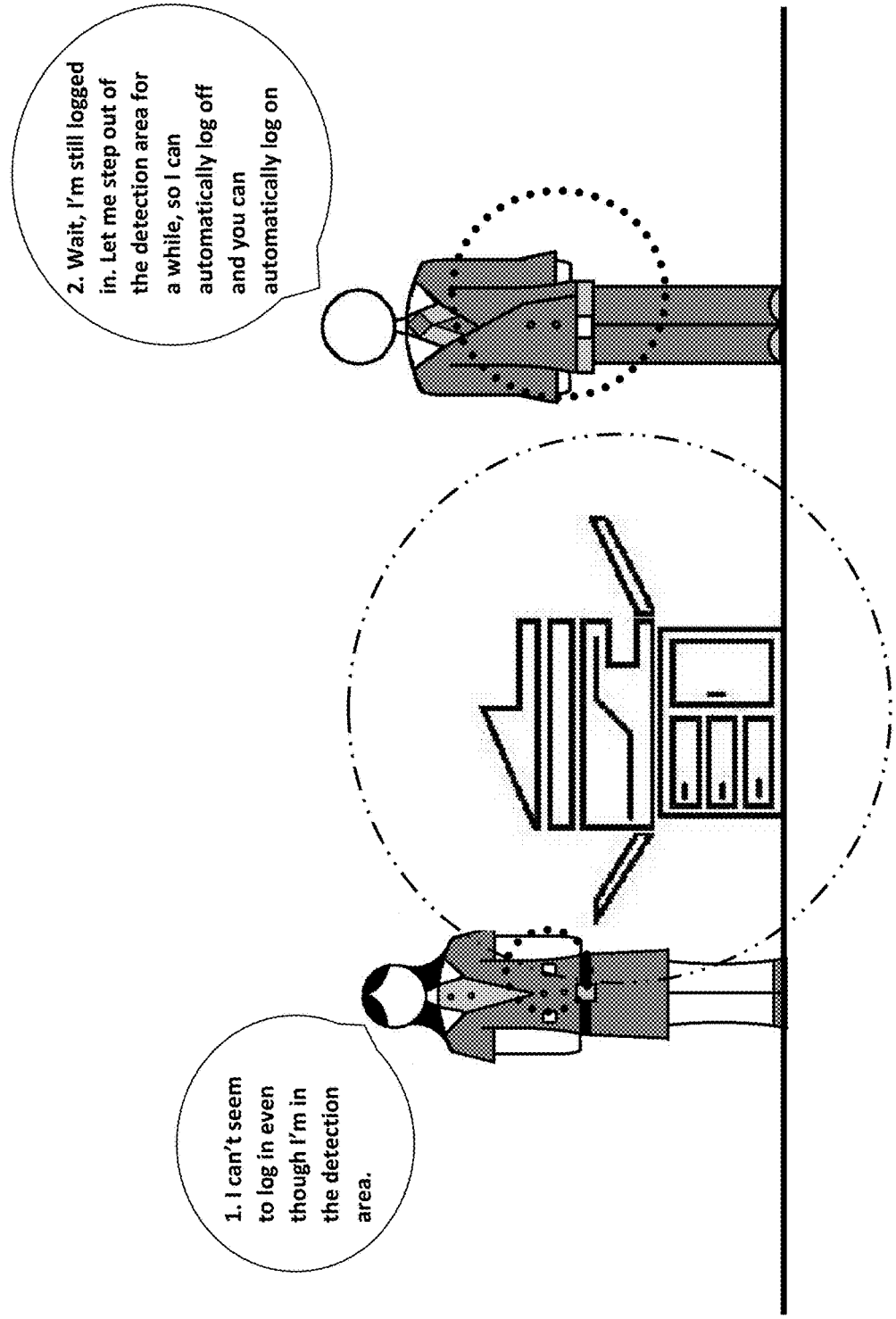
FIG. 12 shows an example of interaction between a mobile apparatus and an output device, in the system shown in FIG. 1 or in the system shown in FIG. 2A.

In the case that a renewal request is not received by the server (step S1107, no), due to, for example, the mobile apparatus being no longer substantially stationary or (ii) the output device being no longer within the range of the short-range operation range of the mobile apparatus. Thus, the server logs the user of the mobile apparatus off from the output device (step S1109). Such a scenarios is shown in FIG. 12, in which "Alice" wants to the use the output device that "Bob" is currently using. Thus, to allow "Alice" to access the output device, "Bob" fulfills one of the aforementioned conditions for preventing a renewal request by the mobile apparatus by moving into a position in which the output device is outside the short-range operation range of his mobile apparatus.

Figure 13A:
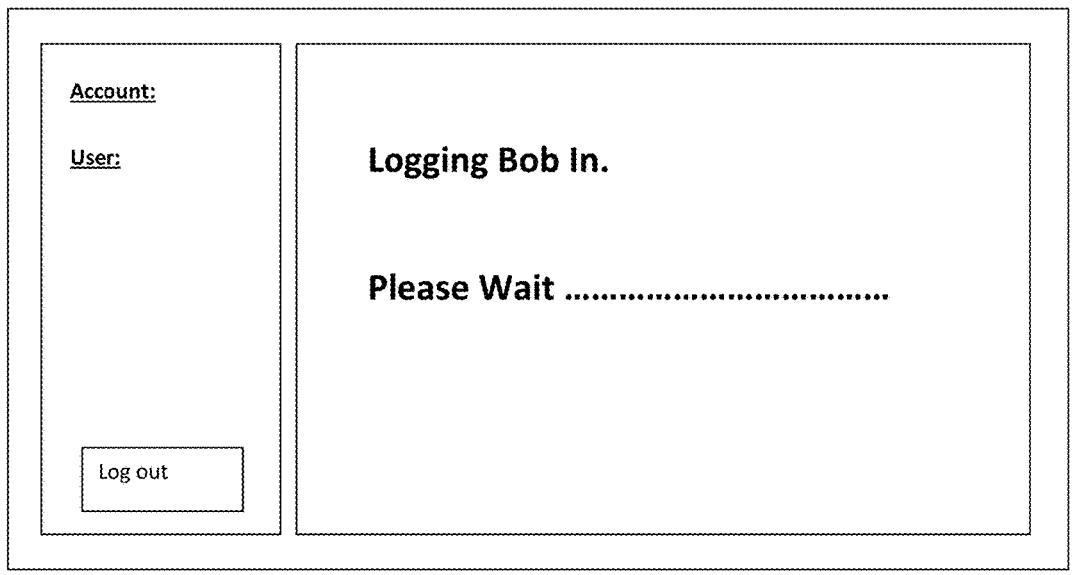
FIGS. 13A-13D show examples of user interface screens that can be provided by an output device, according to an exemplary embodiment.
Figure 13B:
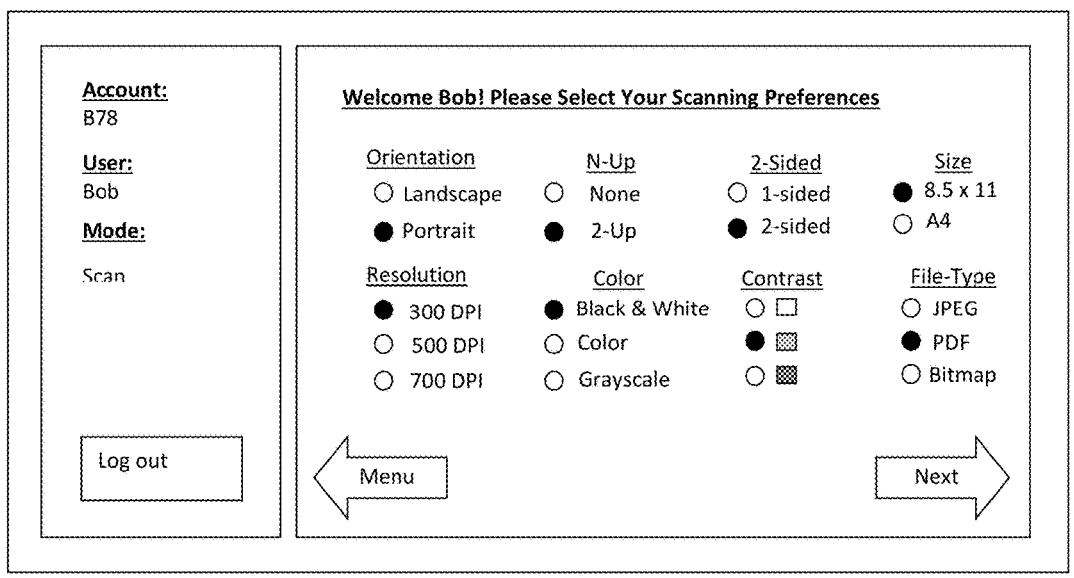
Figure 13C:
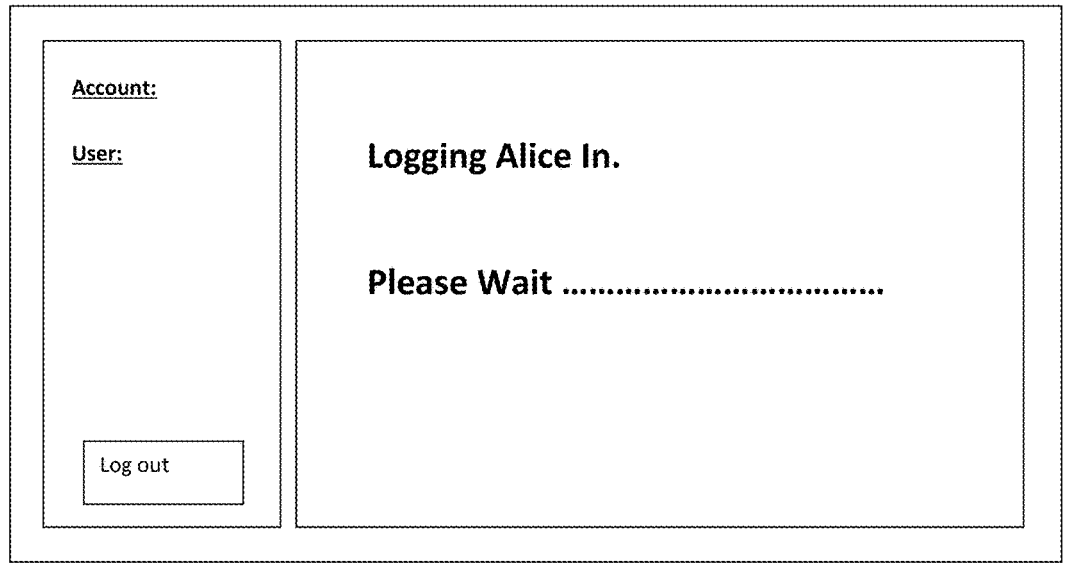
Figure 13D:
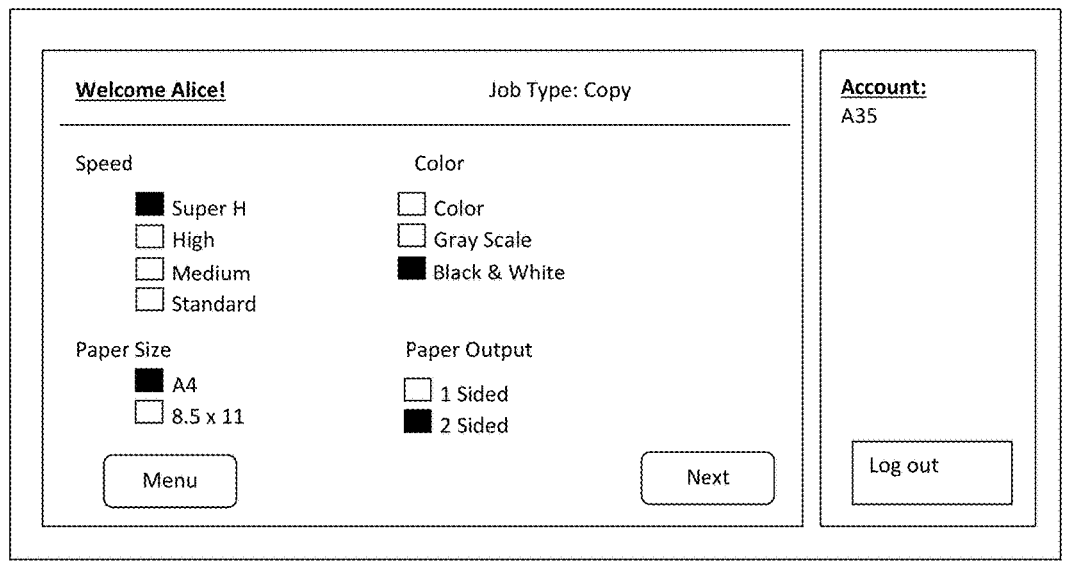

After the user has received permission to utilize the output device, he or she may access the functions of the output device via a user interface screen of the output device. It should be noted that the user interface screen on the output device may be customized for each user. For example, the user interface for "Bob" as shown in FIGS. 13A and 13B is different from the user interface for "Alice" as shown in FIGS. 13C and 13D. In one exemplary embodiment, it may be that "Bob" has a history of performing mostly scan jobs. Thus, the first screen that the user interface screen shows is one for scanning. Likewise, it may be that "Alice" has a history of performing mostly copy jobs, and therefore, the first screen that the user interface screen shows is one for copying. In another exemplary embodiment, "Bob" or "Alice" may have customized the user interface screen via their mobile apparatus beforehand. Thus, when the mobile apparatus uses the authentication token to log on to the output device, the authentication token may contain the information for the customized user interface screen.

Figure 14:
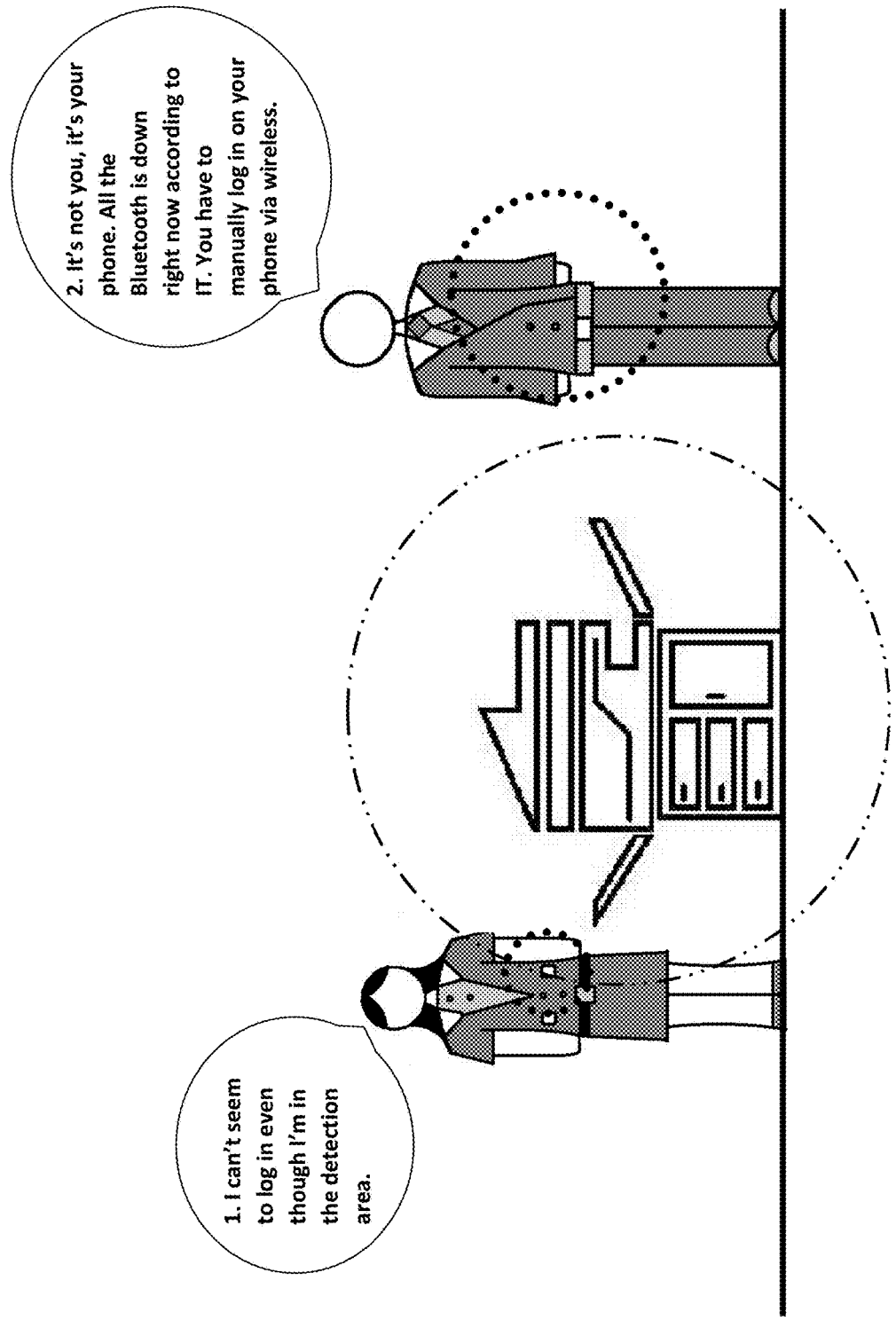
FIG. 14 shows an example of interaction between a mobile apparatus and an output device, in the system shown in FIG. 1 or in the system shown in FIG. 2A.
Figure 15A:
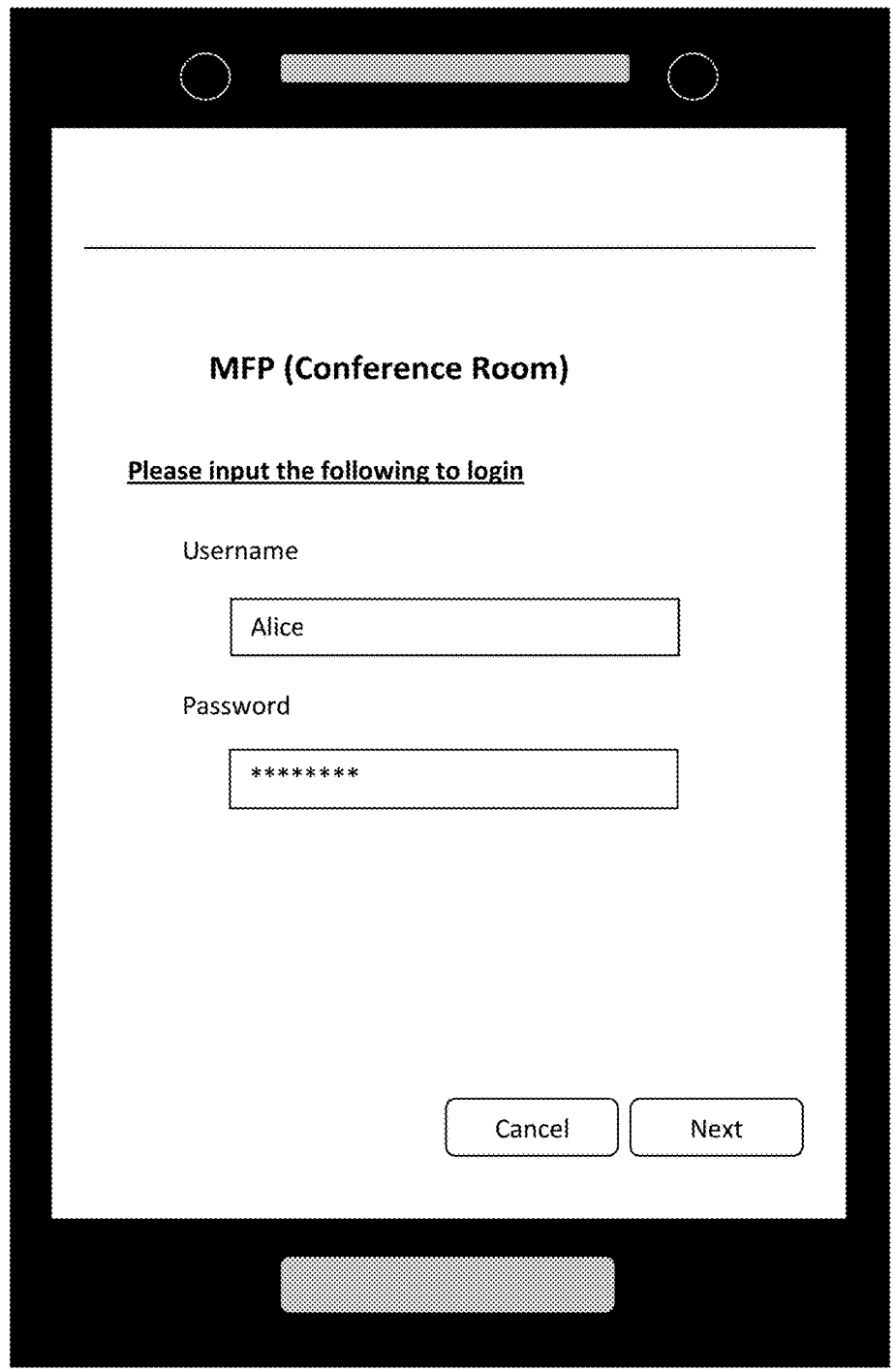
FIGS. 15A and 15B show examples of user interface screens that can be provided by a mobile apparatus, according to an exemplary embodiment.
Figure 15B:
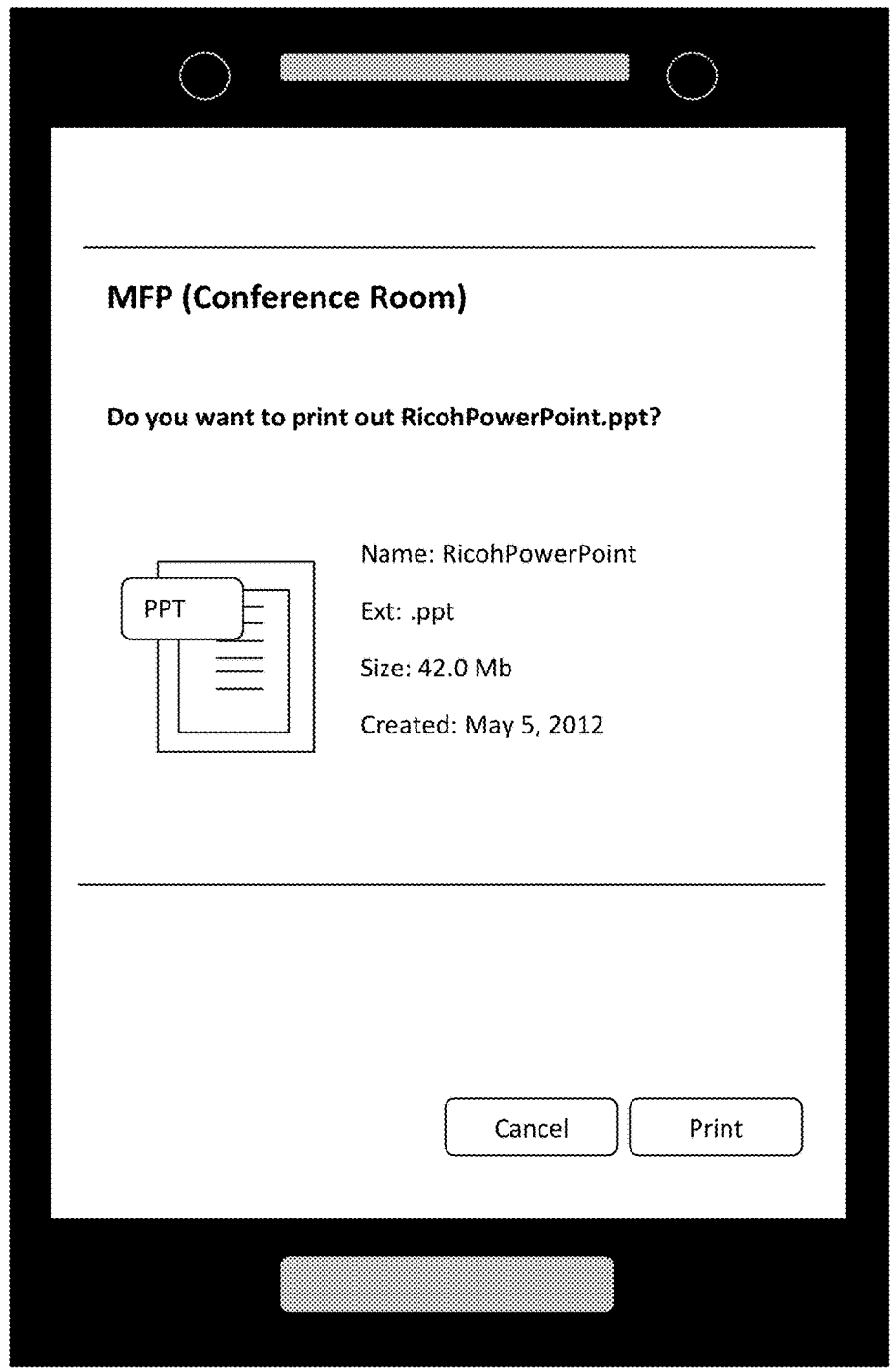

In an exemplary embodiment, the short-range operation range of the mobile apparatus may not be currently working (e.g., malfunction). Thus, in order for the user to operate the output device, he or she must log on via his or her mobile apparatus. For example, as shown in FIG. 14, the short-range operation range may be the Bluetooth protocol. However, according to "Bob" it is not working right now. Thus, "Alice" is forced to use her mobile apparatus to log into the output device as shown in FIG. 15A. In another exemplary embodiment, "Alice" could use her mobile apparatus as a replacement for the user interface on the output device as shown in FIG. 15B.

In some instances, there is an issue when an output device is disposed along a narrow path that most people use (i.e. a path to a restroom). As a result, there is a significant amount of people who walk pass the output device every day without ever intending to use it. Further, due to constraints of the narrow path, every person walking past the output device causes the short-range operation range of his or her mobile apparatus to inevitably overlap with the operating range of the output device. Thus, to prevent the mobile apparatus from automatically logging in every person who walks past it, the mobile apparatus may permit unlocking the output device when the mobile apparatus has substantially stopped moving.

To determine whether a mobile apparatus has substantially stopped moving, the output device measures, at regular intervals for a predetermined period of time, a signal strength of the mobile apparatus for a second time (the first time being when the mobile apparatus measured the signal strength to determine whether the output device had been in the short-range operation region) and compares the measured signal strength at each interval to a predetermined standing threshold range. The signal strength of a signal received from the output device varies over time (i.e. fluctuates), even if the mobile apparatus completely stops moving. Thus, to compensate for this, the mobile apparatus measures the signal strength at regular intervals within the predetermined time period and determines whether each of the measured signal strengths is within a standing threshold range. If each of the measured signal strengths is within a standing threshold range, then the mobile apparatus determines that it has substantially stopped moving.

Figure 16:
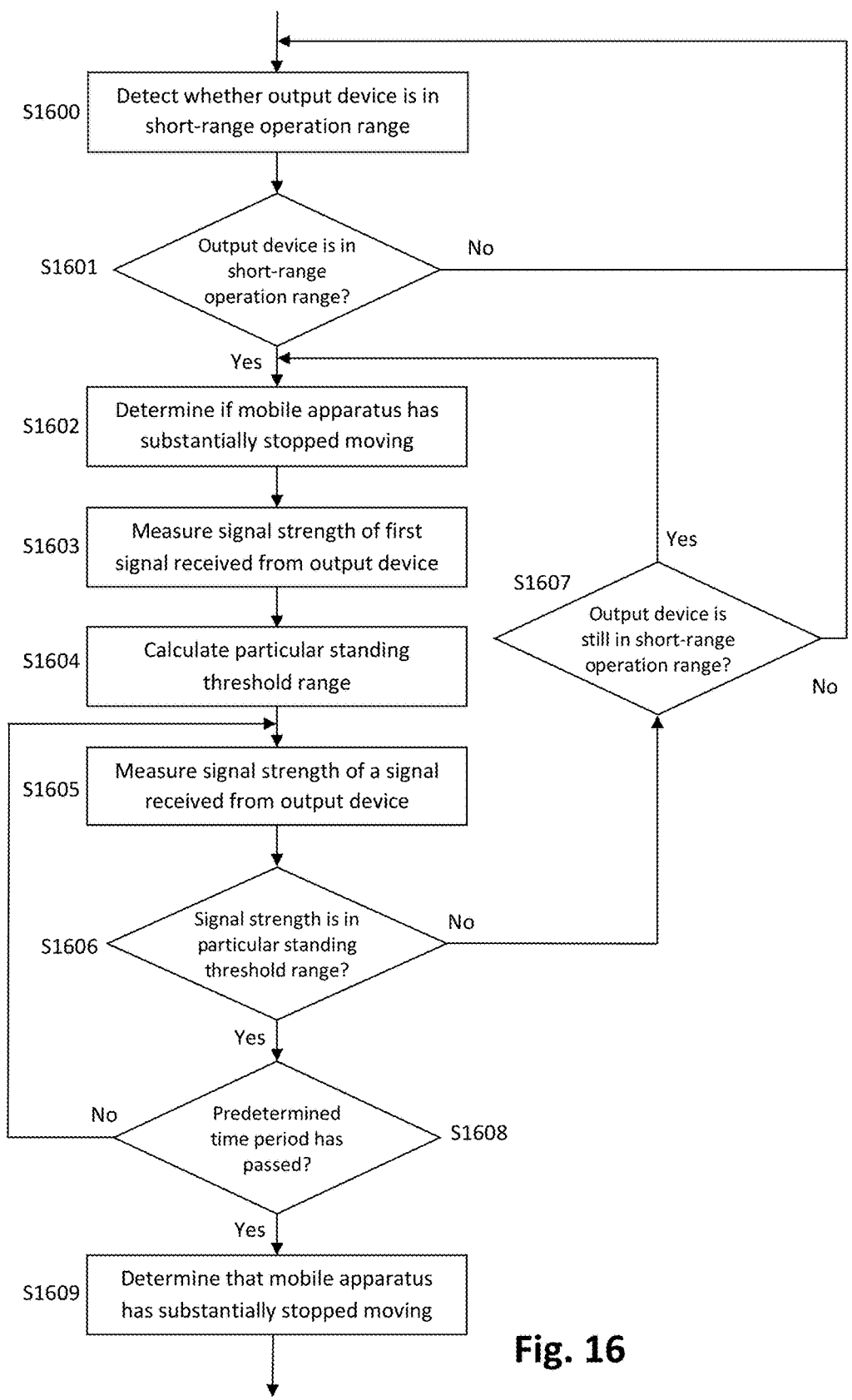
FIG. 16 shows a flow chart of a method that can be performed in the system shown in FIG. 1 or in the system shown in FIG. 2A.

FIG. 16 shows a flow chart of a method that can be performed (by the mobile apparatus, or by the output device) in the system shown in FIG. 1 or in the system shown in FIG. 2A. The mobile apparatus determines if it has substantially stopped moving, by using an initial received signal strength as a baseline for calculating a particular standing threshold range. First, the mobile apparatus determines whether the output device is in the short-range operation range of the mobile apparatus (step S1600). In the case that the output device is not within the operation range of the mobile apparatus (step S1601, no), the mobile apparatus performs the determination again. Otherwise (step S1601, yes), the mobile apparatus determines if the mobile apparatus has substantially stopped moving (step S1602).

This is performed by measuring a first signal strength received from the output device (step S1603). Then the mobile apparatus uses the first signal strength as a baseline in combination with the standing threshold range to calculate a particular standing threshold range (step S1604). The standing threshold range may be set by the manufacturer of the mobile apparatus or an administrator. Next, the mobile apparatus determines whether a subsequent signal strength received from the output device falls into the particular standing threshold range (step S1605). In other words, the mobile apparatus keeps measuring additional signal strengths (i.e. measured after the first signal) received from the output device at regular intervals until a predetermined period has passed.

For example, if the first signal strength was measured to be 10 dB and the standing threshold range was set (e.g., by an administrator) to be +2/−2 dB, then the particular standing threshold range would be between 8-12 dB. As a result, any subsequent measured signal strength that had a value between 8-12 dB would be considered to be in the standing threshold range. On the other hand, any subsequent measured signal strength that had a value other than 8-12 dB would not be within the predetermined standing threshold range. The reason for using the first signal strength as a baseline is that while the output device is assumed to be in the short-range operation range, it does not necessarily mean that the mobile apparatus is always a set distance from the output device. For example, a mobile apparatus for the user "Alice" could be 0.5 foot away from the output device while at another time a mobile apparatus for the user "Bob" could be one foot away from the output device. Thus, the output device is configured to compensate for this type of situation.

If the subsequent signal strength measured by the output device is not within the particular standing threshold range (step S1606, no), the mobile apparatus determines whether the output device is still within the short-range operation range of the mobile apparatus (step S1607). If the output device is still within the short-range operation range of the mobile apparatus (step S1607, yes), the mobile apparatus determines again whether it has substantially stopped moving. Otherwise (step S1607, no), the mobile apparatus performs the determination again of whether the output device is in the short-range operation range of the mobile apparatus. If the subsequent signal strength measured by the output device is within the particular standing threshold range by the time the predetermined time period passes (step S1606, yes), the mobile apparatus determines whether a predetermined time period has passed (step S1608). The predetermined time period, like the standing threshold range, may be set by the manufacturer of the mobile apparatus or an administrator.

If the predetermined time period has not passed (step S1608, no), the mobile apparatus measures another signal strength received from the output device. On the other hand, in the case that the predetermined time period has passed (step S1608, yes), the mobile apparatus determines that it has substantially stopped moving (step S1609).

In an exemplary embodiment, in the case that even one of the signal strengths measured is outside of the particular standing threshold range but the output device is still within the short-range operation range (e.g., the user may be in short-range operation range, but is still walking towards the output device), the mobile apparatus attempts to repeat the process by restarting the predetermined time period and measuring the signal strength at each time interval again. Otherwise, in case that one of the signal strengths measured is outside of the particular standing threshold range and the output device is no longer within the short-range operation range, the mobile apparatus may determine that the user of the mobile terminal apparatus does not intend to use the output device.

In another exemplary embodiment, the predetermined threshold range may not need to be stringent and may allow flexibility. For example, the user and, by extension, the mobile apparatus may not be restricted to standing entirely still but may be allowed to move to some degree (e.g., a few steps) so long as the movement is not extreme.

In another exemplary embodiment, it is not necessary for every one of the measure values to be in the short-range operation range. The mobile apparatus continues to measure the signal strength at each interval (even if one of the measure signal strengths falls outside of the standing threshold range) until the predetermined time period has passed. Once the predetermined time period has passed, the mobile apparatus determines whether the majority of the measured signal strengths fall within the standing threshold range. If the majority of the measured signal strengths does fall within the standing threshold range, the mobile apparatus determines that it has substantially stopped moving. Otherwise, the mobile apparatus determines that it has not substantially stopped moving.

In another exemplary embodiment, the mobile apparatus is not required to determine whether it is substantially still via the signal strengths of signals from the output device. Instead, an accelerometer on the mobile apparatus may determine whether the mobile apparatus is substantially still.

The orders in which the steps are performed in the aforementioned methods are not limited to those shown in the examples of FIGS. 6, 8, 11 and 16, and may be switched as long as similar results are achieved. Also, it should be noted that the methods or processes illustrated in the examples of Figs. FIGS. 6, 8, 11 and 16 may be implemented using any of the systems described in connection with FIGS. 1 and 2.

The aforementioned specific embodiments are illustrative, and many variations can be introduced on these embodiments without departing from the spirit of the disclosure or from the scope of the appended claims. For example, various aspects, features and advantages disclosed herein can applied to automate device driver installation, even when the device for which the driver is needed does not have any print functionality. Further, although the aspects, features and advantages are discussed herein in connection with a print application, it should be understood that such aspects and feature may be integrated in a program that is not application software per se, but may be instead, for example, an operating system, a snap-in, a plug-in, an add-on, an extension, or another program not normally referenced as an application.

In addition, elements and/or features of different examples and illustrative embodiments may be combined with each other and/or substituted for each other within the scope of this disclosure and appended claims.

What is claimed is:

1. A mobile apparatus configured to obtain secure printing and scanning services from one or more output devices, the mobile apparatus including a processor and a storage device storing one or more programs of instructions executable by the processor of the mobile apparatus to configure the mobile apparatus to comprise:

a wireless communication module to communicate through a wireless network interface and a network, with a server for said printing and scanning services, to register the mobile apparatus and authenticate a user of the mobile apparatus;

a short-range communication module configured to communicate by short-range point-to-point communication with an output device amongst the one or more output devices when the output device is within a short-range communication range of the mobile apparatus;

a false-positive detection module that monitors a signal strength of the output device in the short-range point-to-point communication by the short-range communication module with the output device, determines based on said signal strength whether the output device is within a short-range operation range of the mobile apparatus, and determines, when the output device is within the short-range operation range of the mobile apparatus, whether the mobile apparatus is substantially stationary, wherein the false-positive detection module compares (i) the signal strength of the output device at an initial time to (ii) the signal strength of the output device at each of plural instances over a time period after the initial time, and the false-positive detection module determines that the mobile apparatus is substantially stationary when a difference between (i) and (ii) at said each of the plural instances over the time period after the initial time is no more than a registered signal strength difference threshold, and wherein when the false-positive detection module determines that the output device is within the short-range operation range of the mobile apparatus and that the mobile apparatus is substantially stationary, the mobile apparatus communicates with the server to obtain activation of a user interface to operate the output device.

2. The mobile apparatus as claimed in claim 1, wherein the mobile apparatus through the wireless communication module transmits an authentication token and a device identifier identifying the output device to the server, to request validation of the output device.

3. The mobile apparatus as claimed in claim 2, wherein the mobile apparatus obtains from the server the activation of the user interface to operate the output device, if the output device is validated and the output device is not in use by another user.

4. The mobile apparatus as claimed in claim 2, wherein the mobile apparatus transmits user credentials of the user of the mobile apparatus to the server, and upon authentication of the user based on the user credentials, receives the authentication token from the server.

5. The mobile apparatus as claimed in claim 4, wherein the authentication token received from the server is time-limited to a specified time period, and upon expiration of the specified time period, the mobile apparatus retransmits the user credentials to the user for renewal of the authentication token to another specified time period.

6. The mobile apparatus as claimed in claim 4, wherein the authentication token is associated with at least one of the user credentials and a media access control address of the mobile apparatus.

7. The mobile apparatus as claimed in claim 1, wherein for each registered device amongst the one or more output devices for which access to secure printing and scanning services can be obtained through the server, the server registers a media access control address, or another unique device address, of said registered device, and the mobile apparatus through the wireless communication module periodically downloads a current list of registered devices from the server.

8. The mobile apparatus as claimed in claim 7, wherein when the false-positive detection module determines based on signal strength that a new device is within the short-range operation range of the mobile apparatus, the false-positive detection module compares the new device to the current list of registered devices, and if the new device is not on the current list of registered devices, the mobile apparatus does not request activation of the user interface to operate the new device and the mobile apparatus outputs a message to the user to indicate that the new device is not a registered device or that the new device is not available for use.

9. The mobile apparatus as claimed in claim 1, wherein when the false-positive detection module determines that the output device is within the short-range operation range of the mobile apparatus and that the mobile apparatus is not stationary, the mobile apparatus does not request the server for access to the output device.

10. The mobile apparatus as claimed in claim 1, wherein when the false-positive detection module determines that the output device is within the short-range operation range of the mobile apparatus and that the mobile apparatus is substantially stationary, the wireless communication module communicates with the server to request activation of a graphical user interface on the mobile apparatus, for operation of the output device.

11. The mobile apparatus as claimed in claim 1, wherein the short-range operation range of the mobile apparatus is associated with a registered signal strength threshold, and the signal strength threshold is set based on measured signal strength at plural distances.

12. The mobile apparatus as claimed in claim 1, wherein the mobile apparatus through the wireless communication module communicates with the server to obtain activation of the user interface to operate the output device.

13. The mobile apparatus as claimed in claim 1, wherein the mobile apparatus communicates through the output device with the server to obtain activation of the user interface to operate the output device.

14. The mobile apparatus as claimed in claim 1, wherein the mobile apparatus further comprises a login user interface to perform a manual login to the output device, by communication through the wireless communication module, when the false-positive detection module has not determined based on signal strength that the output device is within the short-range operation range of the mobile apparatus.

15. The mobile apparatus as claimed in claim 1, wherein the mobile apparatus through the wireless communication module periodically downloads from the server a current list of subnets supported by the server, and the false-positive detection module determines by communication through the wireless communication module whether the mobile apparatus is within one or more of the supported subnets.

16. The mobile apparatus as claimed in claim 15, wherein when the false-positive detection module determines based on signal strength that a new device is within the short-range operation range of the mobile apparatus, the false-positive detection module determines the one or more of the supported subnets within which the mobile apparatus is disposed and determines whether the new device is an output device within one of the supported subnets.

17. The mobile apparatus as claimed in claim 15, wherein the current list of subnets supported by the server includes, for each subnet amongst the supported subnets, output devices within the subnet, and the false-positive detection module determines, based on the current list of subnets, specified output devices within the one or more of the supported subnets within which the mobile apparatus is disposed.

18. The mobile apparatus as claimed in claim 1, wherein when the false-positive detection module determines that the output device is within the short-range operation range of the mobile apparatus, that the mobile apparatus is substantially stationary, and that another user is in an active session on the output device, the mobile apparatus waits until said another user is no longer in the active session before communicating with the server to obtain activation of the user interface to operate the output device.

19. The mobile apparatus as claimed in claim 1, wherein after activation of the user interface to operate the output device, when the false-positive detection module determines that the output device is no longer within the short-range operation range of the mobile apparatus, or that the mobile apparatus is no longer stationary, or that the user interface has been inactive for at least a predetermined length of time, the user interface is deactivated.

20. A multi-function output apparatus configured to provide secure printing and scanning services that are accessible by a user of a mobile apparatus, the multi-function output apparatus including a processor and a storage device storing one or more programs of instructions executable by the processor of the mobile apparatus to configure the mobile apparatus to comprise:

a wireless communication module to communicate through a wireless network interface and a network, with a server for said printing and scanning services;

a short-range communication module configured to communicate by short-range point-to-point communication with the mobile apparatus amongst one or more mobile apparatuses when the mobile apparatus is within a short-range communication range of the mobile apparatus;

a false-positive detection module that monitors a signal strength of the mobile apparatus in the short-range point-to-point communication by the short-range communication module with the mobile apparatus, determines based on said signal strength whether the mobile apparatus is within the short-range operation range of the mobile apparatus, and determines, when the mobile apparatus is within the short-range operation range of the mobile apparatus, whether the mobile apparatus is substantially stationary, wherein the false-positive detection module compares (i) the signal strength of the output device at an initial time to (ii) the signal strength of the output device at each of plural instances over a time period after the initial time, and the false-positive detection module determines that the mobile apparatus is substantially stationary when a difference between (i) and (ii) at said each of the plural instances over the time period after the initial time is no more than a registered signal strength difference threshold, and wherein when the false-positive detection module determines that the mobile apparatus is within the short-range operation range of the mobile apparatus and that the mobile apparatus is substantially stationary, the multi-function output apparatus communicates with the server to obtain activation of a user interface for the user to operate the multi-function output apparatus.

21. The mobile apparatus as claimed in claim 1, wherein the false-positive detection module determines that the mobile apparatus is substantially stationary if the signal strength of the output device at a majority of the plural instances over the time period after the initial time is within a standing range threshold.

* * * * *